United States Patent
Rasmussen et al.

(10) Patent No.: US 7,030,973 B2
(45) Date of Patent: Apr. 18, 2006

(54) POLARIZATION MODE DISPERSION COMPENSATOR BASED ON DEGREE OF POLARIZATION

(75) Inventors: Jens C. Rasmussen, Kawasaki (JP); George Ishikawa, Kawasaki (JP); Takafumi Terahara, Kawasaki (JP); Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/736,514

(22) Filed: Dec. 17, 2003

(65) Prior Publication Data

US 2004/0124344 A1 Jul. 1, 2004

Related U.S. Application Data

(63) Continuation of application No. PCT/JP01/07568, filed on Aug. 31, 2001.

(51) Int. Cl.
*G01N 21/00* (2006.01)

(52) U.S. Cl. ...................................... 356/73.1

(58) Field of Classification Search ............... 356/73.1, 356/364–368
See application file for complete search history.

(56) References Cited

U.S. PATENT DOCUMENTS 5,337,146 A 8/1994 Azzam
6,211,957 B1 * 4/2001 Erdogan et al. ............ 356/364
6,567,167 B1 * 5/2003 Chou et al. ................. 356/367
2002/0089724 A1 * 7/2002 Nishimoto et al. ......... 359/161

FOREIGN PATENT DOCUMENTS

EP 0553460 8/1993
JP A-2000-31903 1/2000
WO WO 01/61385 8/2001

OTHER PUBLICATIONS

N. Kikuchi, "Analysis of signal degree of polarization degradation used as control signal for optical polarization mode dispersion compensation," Journal of Lightwave Technology, vol. 19, No. 4, pp. 480-486.

J. Sakai, et al., "Degree of Polarization in Anisotropic Single-Mode Optical Fibers: Theory," IEEE Journal of Quantum Electronics, vol. QE-18, No. 4, pp. 488-495.

J. C. Rasmussen, "Selbstkalibrierender faseroptischer Polarizationsanalysator," ("Self-Calibrating Fiber0-Optic Polarization Analyzer") Ph.D Thesis, RWTH Aachen (Germany) ISGN 38265-4450-1, pp. 46-51.

T. Miyakoshi, et al., "A study for wavelength dependency of polarization analysis module", IEICE B-10-95, p. 258.

* cited by examiner

*Primary Examiner*—Layla G. Lauchman
(74) *Attorney, Agent, or Firm*—Staas & Halsey LLP

(57) ABSTRACT

The degree of polarization of an optical signal is measured by a polarimeter and used for providing a feedback signal to adjust adaptive optics of a polarization mode dispersion compensator. The polarization properties of the polarimeter are determined with high accuracy to match the polarimeter through calibration and used to produce the feedback signal.

13 Claims, 30 Drawing Sheets

| No. | θ | ε |
|---|---|---|
| 0 | 0° | 0° |
| 1 | +45° | 0° |
| 2 | −45° | 0° |
| 3 | 0° | 45° |

FIG. 7

| [bit] \ [°] | 2.0 | 1.0 | 0.5 | 0.1 | 0.0 |
|---:|---:|---:|---:|---:|---:|
| 8 | 21.88 | 12.09 | 7.04 | 3.07 | 2.28 |
| 10 | 20.93 | 11.07 | 5.87 | 1.61 | 0.61 |
| 12 | 20.71 | 10.78 | 5.56 | 1.23 | 0.15 |
| 14 | 20.65 | 10.72 | 5.48 | 1.13 | 0.03 |
| 16 | 20.64 | 10.71 | 5.47 | 1.12 | 0.01 |

FIG. 16

| [bit] \ [°] | 2.0 | 1.0 | 0.5 | 0.1 | 0.0 |
|---:|---:|---:|---:|---:|---:|
| 8 | 18.77 | 9.95 | 5.64 | 2.28 | 1.59 |
| 10 | 17.87 | 9.0 | 4.65 | 1.21 | 0.42 |
| 12 | 17.67 | 8.79 | 4.43 | 0.95 | 0.12 |
| 14 | 17.64 | 8.76 | 4.38 | 0.89 | 0.03 |
| 16 | 17.63 | 8.75 | 4.37 | 0.88 | 0.008 |

FIG. 20

| [bit] \ [°] | 2.0 | 1.0 | 0.5 | 0.1 | 0.0 |
|---|---|---|---|---|---|
| 8 | 15.82 | 8.44 | 4.82 | 1.95 | 1.38 |
| 10 | 15.13 | 7.65 | 3.96 | 1.01 | 0.35 |
| 12 | 14.95 | 7.45 | 3.75 | 0.8 | 0.09 |
| 14 | 14.91 | 7.41 | 3.7 | 0.75 | 0.02 |
| 16 | 14.9 | 7.4 | 3.69 | 0.74 | 0.005 |

F I G. 24

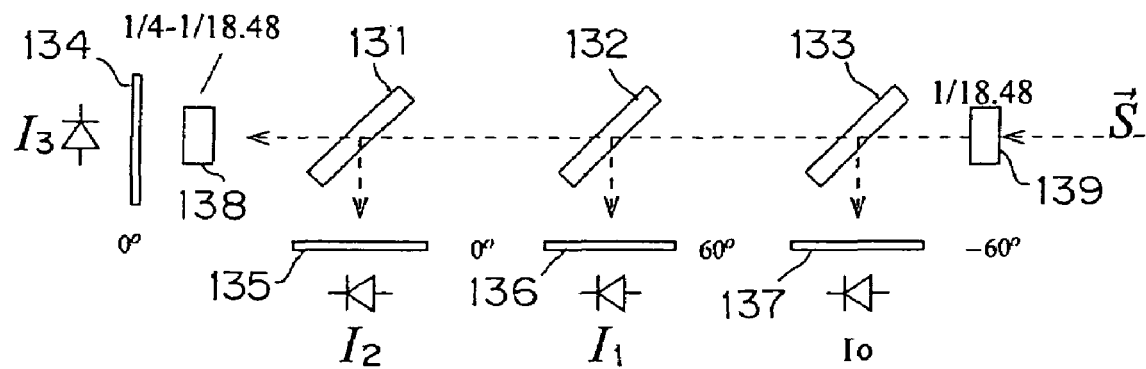
F I G. 26

POLARIZATION MODE DISPERSION COMPENSATOR BASED ON DEGREE OF POLARIZATION

CROSS REFERENCE TO RELATED APPLICATION

This application is a continuation application of International PCT Application No. PCT/JP01/07568 which was filed on Aug. 31, 2001.

BACKGROUND OF THE INVENTION

1. Field of the Invention

The present invention relates to a polarization mode dispersion compensator for analyzing signal distortion due to polarization mode dispersion in optical transmission systems and therefore providing a feedback signal to adjust adaptive optics used for mitigating polarization mode dispersion.

2. Description of the Related Art

The higher the bit rate of an optical transmission system, the more a specific amount of polarization mode dispersion of an optical fiber distorts the transmitted signal.

Due to polarization mode dispersion, the two modes in a so called single-mode fiber propagate with different velocities. An initial pulse splits its energy into the two modes. The two modes experience a differential delay during propagation. This leads to pulse spreading at the end of the fiber. The more the differential delay between the two modes is in the order of the bit duration, the more neighboring pulses will overlap, which leads at least to an increasing bit-error rate or makes it even impossible to differentiate the pulses. Polarization mode dispersion is due to internal birefringence (e.g. fiber core geometry irregularities) or externally induced birefringence (e.g. bending, squeezing, etc.). Because in a long single-mode fiber, polarization mode coupling occurs at randomly varying locations with randomly fluctuating strength due to e.g. environmental changes like temperature, polarization mode dispersion itself varies over time. It is well known, that the instantaneous differential group delay between the principal states of polarization follows a Maxwellian probability density function. The mean of the Maxwellian distributed instantaneous differential group delay is known as the average differential group delay, or the polarization mode dispersion value (PMD) of the fiber. The polarization mode dispersion value is, for long single-mode fibers with high polarization mode coupling, proportional to the square root of the fiber length.

To mitigate signal distortion due to polarization mode dispersion, optical elements introducing a similar amount of differential group delay as in the fiber but with an opposite sign, can be placed at the end of the fiber. Due to the random nature of the instantaneous differential group delay and the principal states of polarization in a long optical fiber, the optical elements used for compensating polarization mode dispersion must be adaptively adjusted to the momentary fiber conditions. A closed loop design, polarization mode dispersion compensator consequently consists of:
1. adaptively adjustable optical elements (adaptive optics)
2. distortion analyzer
3. control logic as depicted in FIG. 1.

In FIG. 1, the distortion analyzer 12 provides a measure of signal distortion for the control logic 13 to adaptively adjust the adaptive optics 11, such that they best match the momentary polarization mode dispersion conditions of the optical fiber.

Beside methods like for example spectral hole burning (SHB), direct eye-opening analyzing, etc., the degree of polarization (DOP) can be used for analyzing signal distortion due to polarization mode dispersion. For those who are skilled in the art, it is well known that a light beam experiences depolarization if the coherence length, which is inversely proportional to the spectral width, is in the order of the differential group delay. The higher the differential group delay becomes compared to the coherence length, the more the beam gets depolarized and its degree of polarization decreases. This well known physical effect is straightforward to be used as a feedback signal to adaptively control optical elements of a polarization mode dispersion compensator. Derivation of the depolarization of an optical signal due to fiber anisotropies as a function of signal spectrum (bandwidth, form), differential group delay and state of input polarization is shown in the following reference.

"Degree of Polarization in Anisotropic Single-Mode Optical Fibers: Theory", Jun-ichi Sakai, SusumuMachida, Tatsuya Kimura, IEEE Journal of Quantum Electronics, Vol. QE-18, No. 4, pp. 488–495, 1982

Compared to spectral hole burning, measuring directly the eye-opening or bit-error rate detection, the advantages of using degree of polarization as a feedback signal for adaptive polarization mode dispersion compensation are:
1. independent of bit rate
2. applicable to any modulation format without requiring modifications
3. insensitive to chromatic dispersion, such that degree of polarization provides a good measure of signal distortion due to only polarization mode dispersion Depicted in FIG. 2 are as a function of instantaneous differential group delay the degree of polarization and Q-penalty of a transmitted signal, non-return to zero (NRZ) format modulated with a bit rate of 48 Gbit/s. The Q-penalty is defined here as:

$$Q\text{-penalty} = 20 \cdot \log \frac{\text{Eye-opening of received signal}}{\text{Back-to-back eye-opening}}. \quad (1)$$

For reference, also shown in FIG. 2 is the power of the 24 GHz (half the bit rate) spectral component as a function of instantaneous differential group delay. The spectral component at half the bit rate has been proved to show the strongest dependence on instantaneous differential group.

Contrary to the degree of polarization which shows only one maximum if the instantaneous differential group delay vanishes, the 24 GHz spectral component shows a periodic behaviour. Therefore, in cases where the instantaneous differential group delay is expected to exceed on bit duration, at least one more spectral component, namely the 12 GHz (quarter of the bit rate) must be additionally tested to avoid an ambiguity.

The details of degree of polarization and the power of spectral components at 24 GHz (half the bit rate), 12 GHz (quarter of the bit rate) and 6 GHz (eighth the bit rate) are depicted in FIG. 3 for small values of the instantaneous differential group delay.

Of critical importance in the application of degree of polarization as a feedback signal in an adaptive polarization mode dispersion compensator, is the accuracy (particularly the variance of the measured degree of polarization with the input state of polarization) with which the degree of polarization can be measured.

As can be seen from FIG. 2, if for example a Q-penalty of 0.5 dB must not be exceeded, the dynamic range of the degree of polarization is ±5%. The uncertainty, with which the degree of polarization is measured, must therefore not exceed 5%. An adaptive control algorithm of a polarization mode dispersion compensator needs to sample the degree of polarization in the environment of the optimum point in order to track the randomly varying differential group delay and principal states of polarization. Because of the required sampling by slightly mismatching the optical elements with respect to the polarization mode dispersion conditions in the optical fiber, the required accuracy with which the degree of polarization can be measured is much more stringent.

A common approach for realizing the required accuracy is to mechanically align the optical components of a polarimeter in a distortion analyzer with high accuracy to predefined angles. However, this is a very tedious and therefore cost intensive way of construction.

SUMMARY OF THE INVENTION

It is an object of the present invention to provide a polarization mode dispersion compensator based on degree of polarization, which does not require a tedious and cost intensive way of construction.

The polarization mode dispersion compensator according to the present invention comprises an optical unit, a distortion analyzer and a controller. The optical unit receives an input optical signal and outputs an output optical signal. The distortion analyzer includes a polarimeter, analyzes the output optical signal and produces a feedback signal, which represents degree of polarization of the output optical signal, by using a polarization property of the polarimeter. The polarization property is determined through calibration using intensity signals output from the polarimeter. The controller produces a control signal to adjust the optical unit, based on the feedback signal.

The optical unit corresponds to adaptive optics and includes one or more optical elements, the controller corresponds to control logic which controls the optical unit using the degree of polarization as a feedback signal. The polarization property of the polarimeter is determined in advance to match the actual polarimeter through calibration. The distortion analyzer analyzes the output optical signal from the optical unit, produces the feedback signal by using the obtained polarization property and outputs it to the controller. Because the polarization property is measured after the polarimeter is completely assembled, the requirements on mechanical alignment accuracy are drastically relaxed. Tedious, highly-accurate mechanical alignment is no longer necessary, which can lead to a drastic cost reduction.

BRIEF DESCRIPTION OF THE DRAWINGS

FIG. 7 shows parameters of the elliptical retarders.

FIG. 16 shows dependence of DOP accuracy on noise and angular uncertainty for an orthogonal type configuration.

FIG. 20 shows dependence of DOP accuracy on noise and angular uncertainty for a tetragonal type configuration.

FIG. 24 shows dependence of DOP accuracy on noise and angular uncertainty for a diamond type configuration.

FIG. 26 shows another variant configuration of a diamond type polarimeter.

DESCRIPTION OF THE PREFERRED EMBODIMENTS

Figure 1:
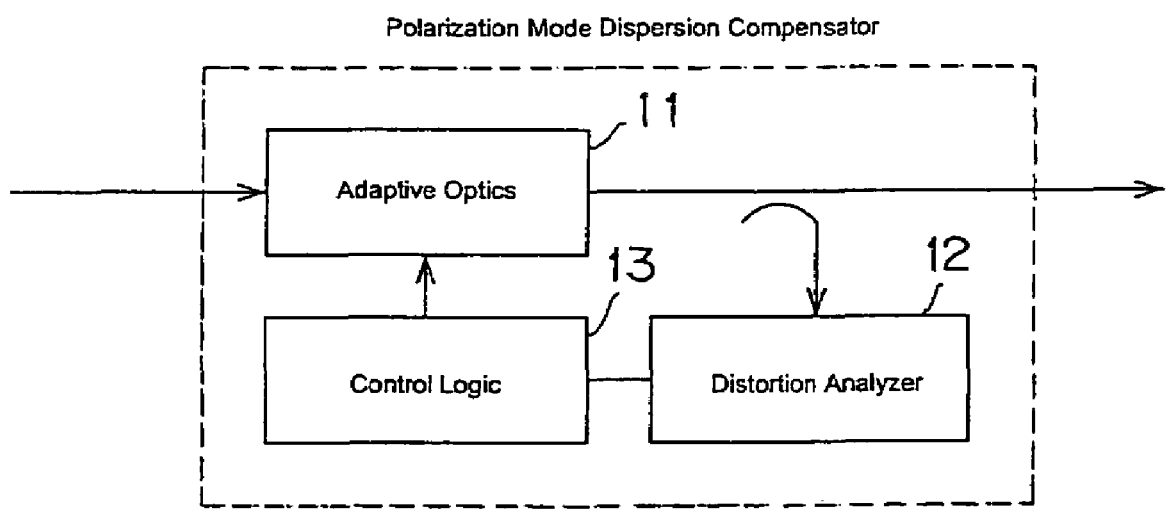
FIG. 1 shows a configuration of a conventional polarization mode dispersion compensator.
Figure 2:
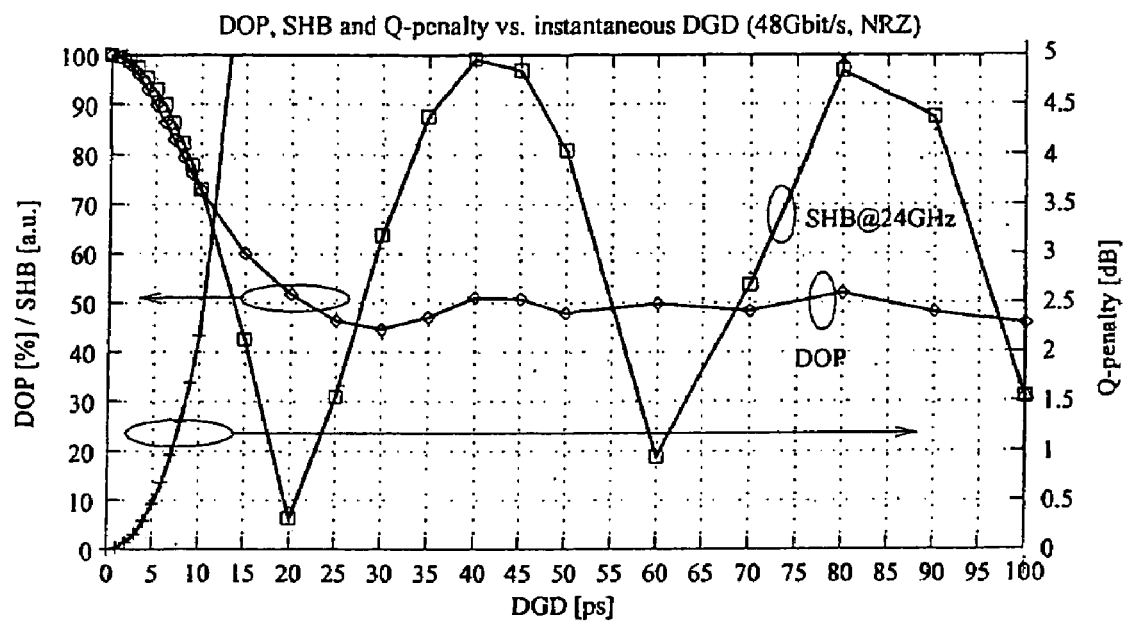
FIG. 2 shows degree of polarization, Q-penalty and a spectral component as a function of instantaneous differential group delay.
Figure 3:
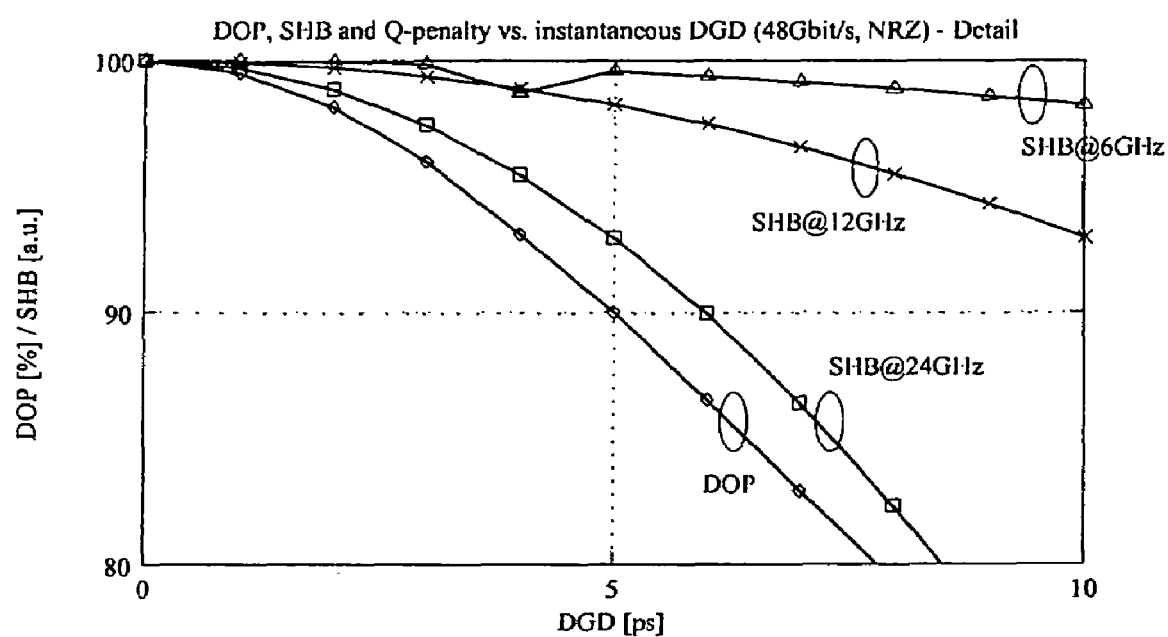
FIG. 3 shows detail of degree of polarization, Q-penalty and a spectral component as a function of instantaneous differential group delay.

Hereinafter, preferred embodiments according to the present invention will be described in detail by referring to the drawings.

As a physical property of light, the degree of polarization is used for providing a feedback signal to adjust adaptive optics of a polarization mode dispersion compensator.

To measure the degree of polarization, an incident beam of light is split into four or more beams, each of which passes through individually arranged retardation and polarizing optics. This type of polarization measurement system can be called a division of amplitude type polarimeter. From the intensities of those beams, the state of polarization and the degree of polarization can be calculated if, and only if, the polarization properties of the paths each beam travels are known. The accuracy with which the state of polarization and degree of polarization can be measured by such an instrument, depends strongly on the accuracy with which the polarization properties of each path, particularly e.g. polarizer angle, retardance of a path, etc. are known. In the following, an advantageous solution for measuring the polarization properties with high accuracy of each of the split beams is described.

Figure 4:
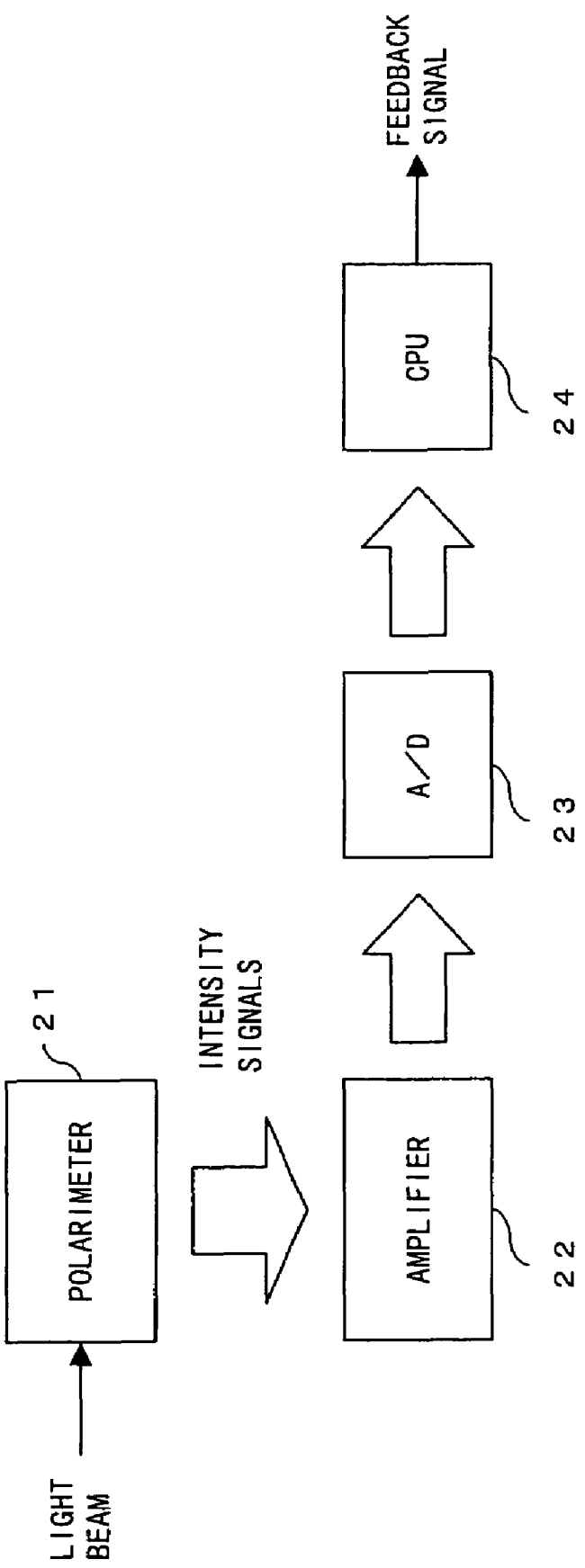
FIG. 4 shows a configuration of a distortion analyzer.

FIG. 4 shows an example of the configuration of a distortion analyzer which measures the degree of polarization and/or the state of polarization. The polarimeter 21 splits a light beam into several beams and outputs intensity signals of those beams. The intensity signals are amplified by the amplifier 22 and converted into digital signals by the analog-to-digital (A/D) converter 23. The central processing unit (CPU) 24 calculates the degree of polarization and/or the state of polarization using the values of the digital signals and outputs the obtained result as a feedback signal.

In the following, various methods will be described to applying degree of polarization as a feedback signal to adaptive polarization mode dispersion compensators. The described methods include advantageous construction of polarimeters with respect to degree of polarization measurement accuracy. To relax the stringent requirements on how exact optical components are aligned, or their orientation is at least known, calibration methods will be described including adapted variations of polarimeter constructions.

As mentioned above, a division of amplitude type polarimeter refers to a polarimeter in which an incoming light beam is split into several beams. Each beam is then individually guided through optical components like polarizer (analyzer) and retarder. From the measured intensities, the state of polarization can be calculated.

Figure 5:
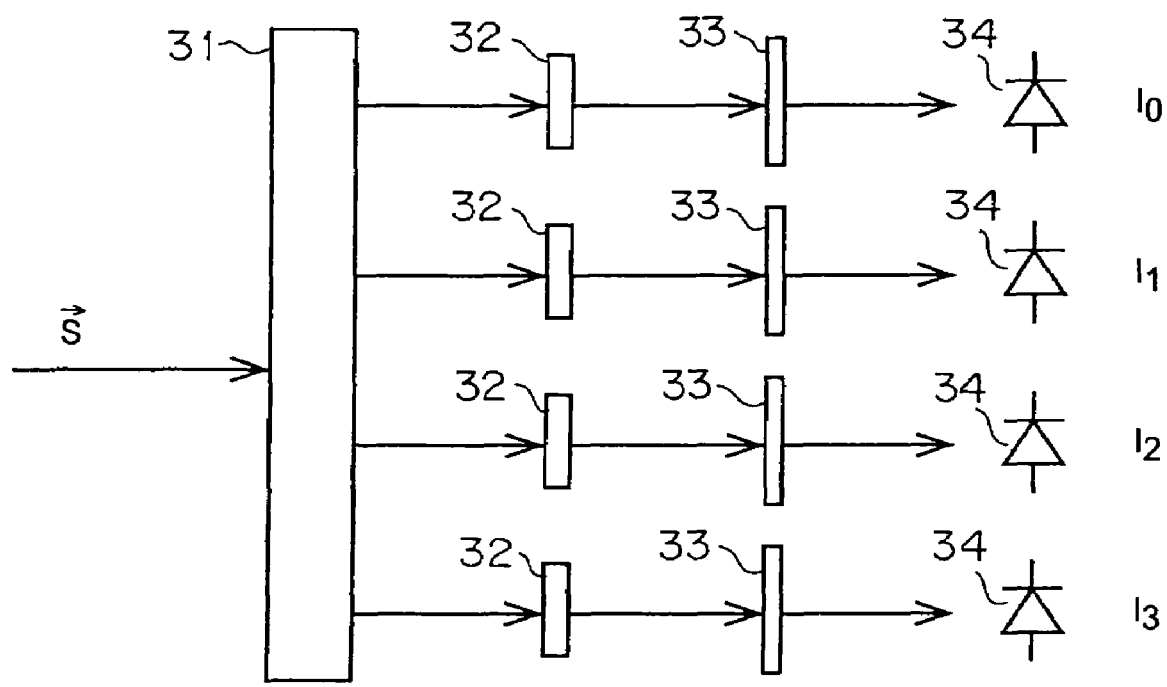
FIG. 5 shows a model of a division of amplitude type polarimeter.

A division of amplitude type polarimeter can be modeled as depicted in FIG. 5. An incoming light beam $\vec{S}$ is split into four beams (more than four beams possible, four beams selected for description for clarity reasons) by beam splitter 31. Each of the split beams propagates through a combination of retarder 32 and polarizer 33 and their respective intensities $I_0$, $I_1$, $I_2$ and $I_3$, are detected by photodiodes 34. The retarder/polarizer combination represents an elliptical polarizer, characterized by an azimut $\theta$, an ellipticity $\epsilon$ and an extinction ratio ER. The extinction ratio is the relation between the minimum, $\tau_{min}$, and maximum, $\tau_{max}$, transmitted intensity for all possible input states of polarization. The polarization properties each beam experiences while propagating from the input through the beam splitter 31 until it reaches the polarizer 33, are incorporated in this model by the respective retarder/polarizer combination.

The relation between the detected intensities $I_0$, $I_1$, $I_2$ and $I_3$, and the polarization of light at the input of the beam splitter 31 (Stokes vector $\vec{S}$) can be given as:

$$\begin{pmatrix} I_0 \\ I_1 \\ I_2 \\ I_3 \end{pmatrix} = Z \cdot \vec{S}, \quad (2)$$

-continued $$Z = \begin{pmatrix} \tau_{a0} & \tau_{d0}\cos2\theta_0\cos2\varepsilon_0 & \tau_{d0}\sin2\theta_0\cos2\varepsilon_0 & \tau_{d0}\sin2\varepsilon_0 \\ \tau_{a1} & \tau_{d1}\cos2\theta_1\cos2\varepsilon_1 & \tau_{d1}\sin2\theta_1\cos2\varepsilon_1 & \tau_{d1}\sin2\varepsilon_1 \\ \tau_{a2} & \tau_{d2}\cos2\theta_2\cos2\varepsilon_2 & \tau_{d2}\sin2\theta_2\cos2\varepsilon_2 & \tau_{d2}\sin2\varepsilon_2 \\ \tau_{a3} & \tau_{d3}\cos2\theta_3\cos2\varepsilon_3 & \tau_{d3}\sin2\theta_3\cos2\varepsilon_3 & \tau_{d3}\sin2\varepsilon_3 \end{pmatrix}$$

The angles $\theta_0$, $\theta_1$, $\theta_2$, $\theta_3$, and $\epsilon_0$, $\epsilon_2$, $\epsilon_3$ describe the elliptical retarder properties of each retarder/polarizer combination. The coefficients $\tau_{a0}$, $\tau_{a1}$, $\tau_{a2}$ and $\tau_{a3}$, and $\tau_{d0}$, $\tau_{d1}$, $\tau_{d2}$ and $\tau_{d3}$ are related to the minimum, $\tau_{min}$, and maximum, $\tau_{max}$, transmitted intensity (transmission coefficient) for all possible input states of polarization by:

$$\tau_a = (\tau_{max} + \tau_{min})/2, \quad (3)$$

$$\tau_d = (\tau_{max} - \tau_{min})/2. \quad (4)$$

Figure 6:
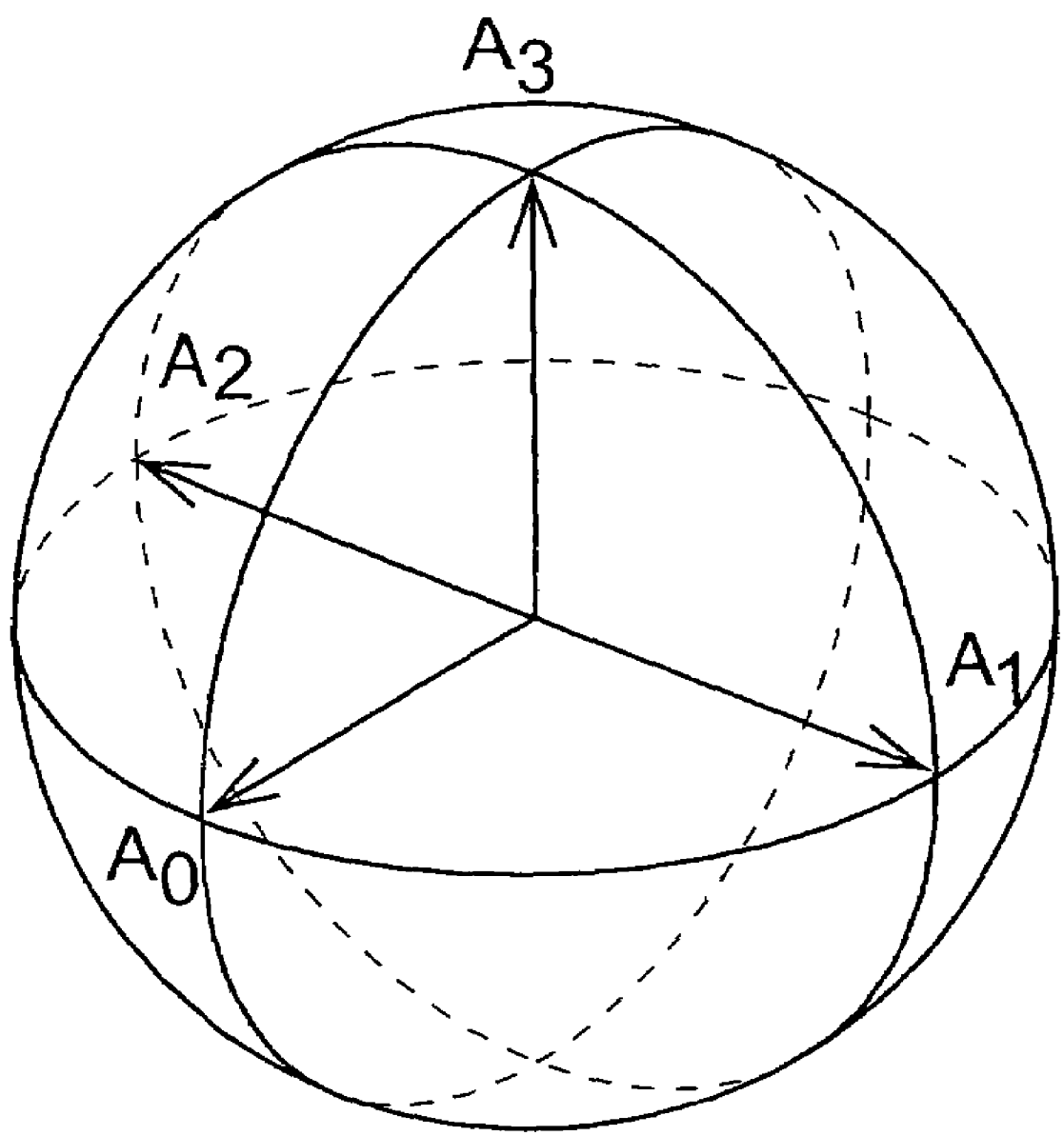
FIG. 6 shows representation of polarization properties of a division of amplitude type polarimeter in a Poincaré sphere.

Each row of the instrument matrix Z can be thought of in the same way as a Stokes vector, describing a state of polarization with azimut $\theta$ and ellipticity $\epsilon$. Consequently, the retarder/polarizer combination each beam passes, can be represented by a point on the Poincaré sphere as depicted in FIG. 6. The representation in the Poincaré sphere of the polarization properties each beam experiences, can be called equivalent analyzer polarization.

Figure 7:
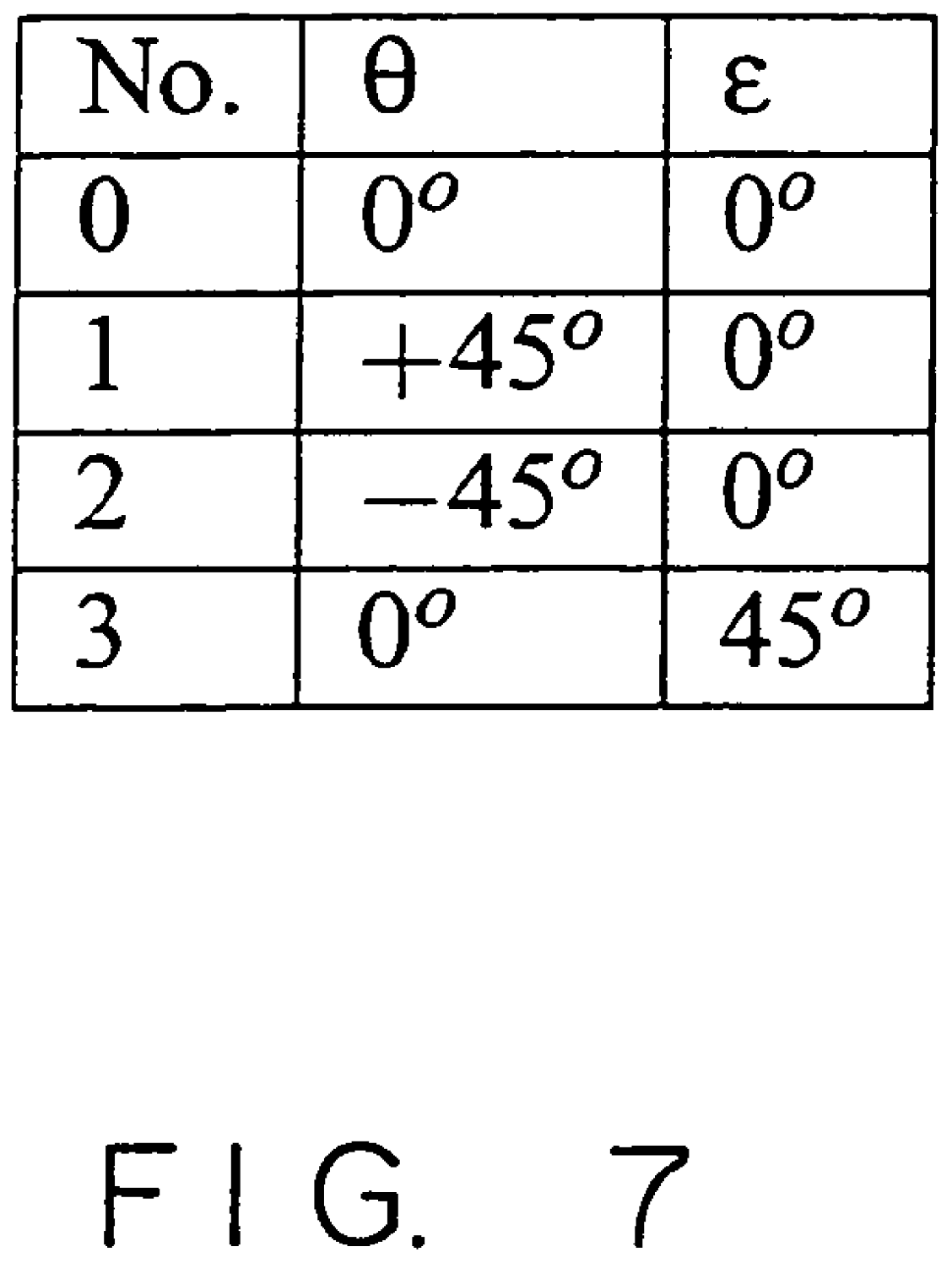

The depicted example of equivalent analyzer polarizations A0, A1, A2 and A3 shows the situation for a division of amplitude type polarimeter, whereas the parameters of the elliptical retarders (equivalent analyzers) are as shown in FIG. 7.

In the case the equivalent analyzer polarizations and respective extinction ratios are known, the division of amplitude polarimeter is fully characterized with respect to its polarization properties. The instrument matrix Z can be calculated and the Stokes vector $\vec{S}$ at the input of the polarimeter can be calculated from the detected intensities $I_0$, $I_1$, $I_2$ and $I_3$ at the photodiodes 34.

A conventional procedure is to first select values for the equivalent analyzer polarizations and then assembling the optical components such that their mechanical alignment match the preselected instrument matrix. Depending on required accuracy, the alignment must be very precise. This leads to a tedious and cost intensive assembling.

A different approach, outlined in the following, provides a procedure to measure the equivalent analyzer polarizations and respective extinction ratios with high accuracy. The optical components can therefore be assembled with relaxed requirements on alignment precision. This leads to an improved performance while at the same time providing a way of cost reduction for assembling.

Figure 8:
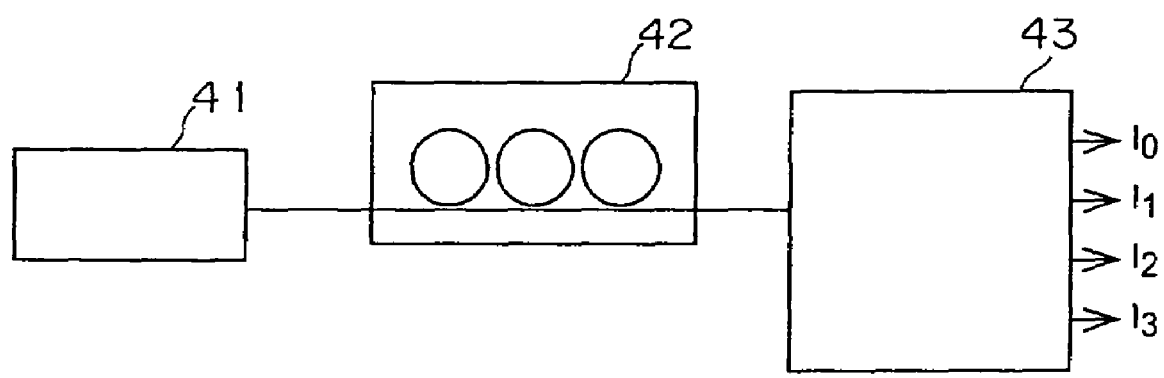
FIG. 8 shows a setup for calibration of a division of amplitude type polarimeter.

FIG. 8 shows a setup for autonomous calibration of a division of amplitude type polarimeter. The calibration procedure starts by measuring an assemble of intensity vectors $I_0$, $I_1$, $I_2$ and $I_3$ for different states of input polarization. The different states of input polarization are provided by narrow-bandwidth laser 41 launching fully polarized light (DOP=100%) into polarization converter 42 with negligible or at least very low variation of its insertion loss.

The free-running or by means of external signals controlled polarization converter 42 launches states of polarization into the, to be calibrated, division of amplitude polarimeter 43 such that the Poincaré sphere is fully covered.

Figure 9:
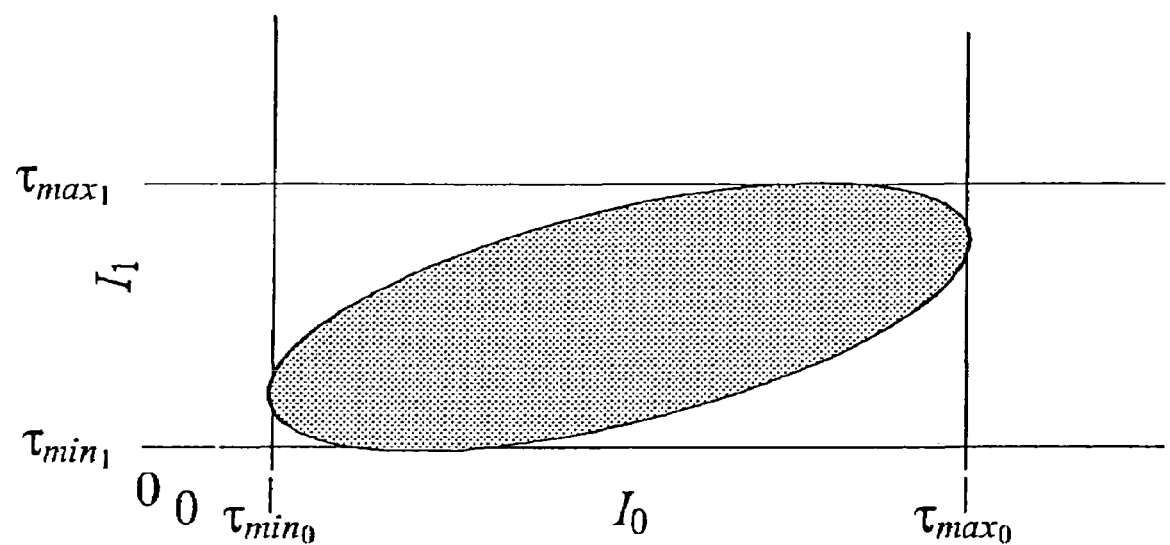
FIG. 9 shows a parametric plot of two intensity signals.

In the case the input polarization is modulated in this way, a parametric plot of any two out of the four intensity signals leads always to points in a plane surrounded by an ellipse as depicted in FIG. 9. The left, right, lower and upper bounds of the ellipse equal the minimum, $\tau_{min}$, and maximum, $\tau_{max}$, transmission coefficients of the respective analyzers.

Figure 10:
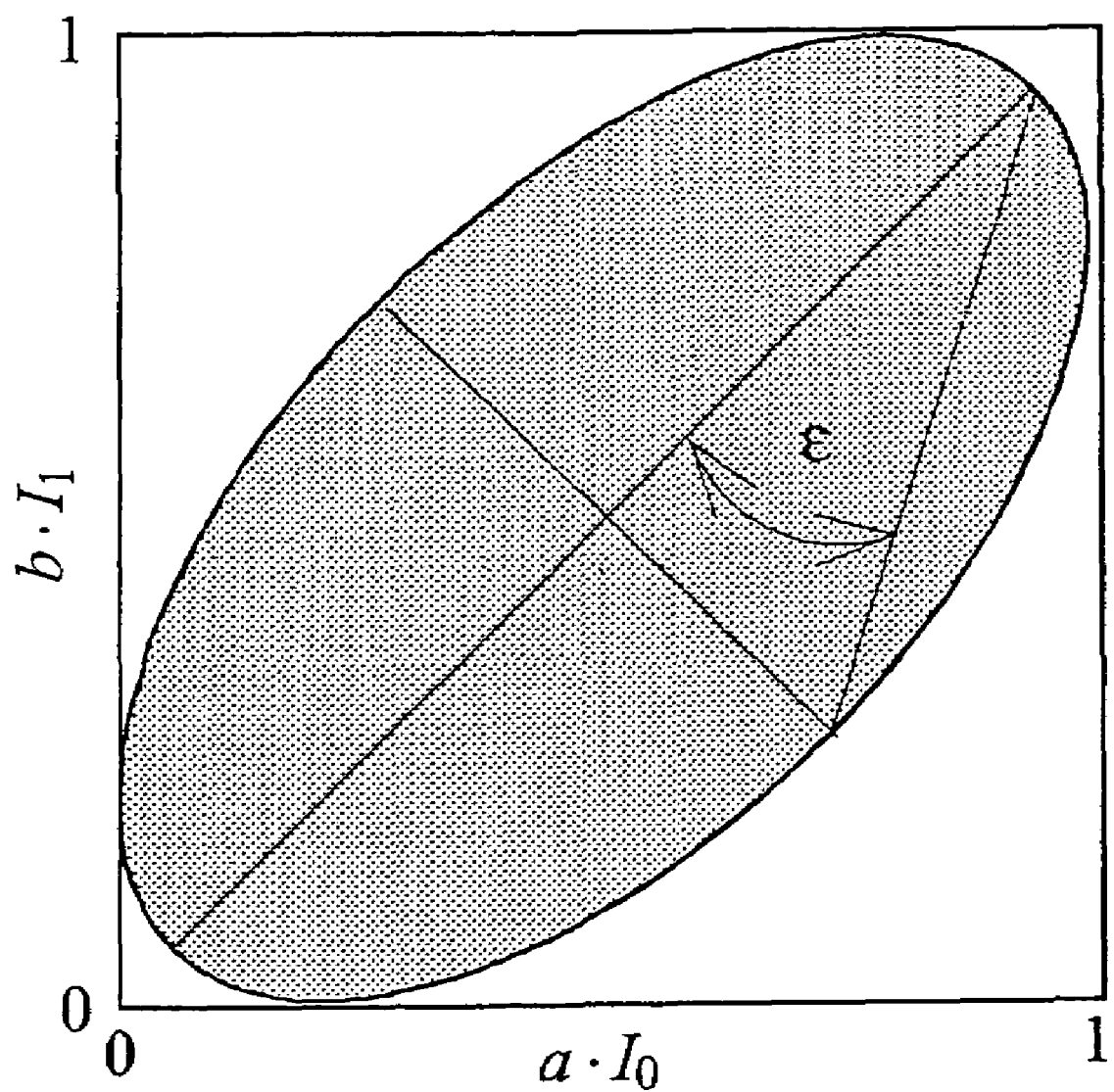
FIG. 10 shows a scaled parametric plot of two intensity signals.

After scaling the intensity signals such that the ellipse fits into a square with length of the sides of 1 (multiplication of the intensity signals with factors a and b) as depicted in FIG. 10, the ellipticity $\epsilon$ equals, in Poincaré sphere representation, half of the angular spacing $\epsilon_{01}$ between the two equivalent analyzer polarizations for which the parametric plot was drawn. In the following reference, construction of an all-fiber optical in-line and off-line polarization analyzer is shown and application of a setup in which a device under test is placed between in-line and off-line polarimeter to characterize its polarization transfer function is described. Measurable parameters are polarization dependent loss, retardation, differential group delay and depolarization. Further included applications are fiber-optical polarimetric sensors, particularly temperature sensors. Especially, mathematics related to properties of intensity vectors of a division of amplitude type polarimeter is described on pages 46 through 51.

"Selbstkalibrierender faseroptischer Polarisationsanalysator", Jens C. Rasmussen, Ph.D thesis, RWTH Aachen (Germany), Shaker Verlag, ISBN 3-8265-4450-1, 1998

After the relative angular distances $\epsilon_{01}$, $\epsilon_{02}$, $\epsilon_{03}$, $\epsilon_{12}$ and $\epsilon_{13}$ between the equivalent analyzer polarizations are known, the absolute positions are derived as follows.

The measurement of the degree of polarization is invariant to a rotation of the reference frame (rotation of the Poincaré sphere in both possible directions) for which the state of polarization is measured. Even for the measurement of the state of polarization itself, a rotation of the reference frame always happens during light propagates through an optical fiber due to internal and externally introduced birefringence. The absolute orientation of the reference frame (angular orientation of the Poincaré sphere) is therefore not important in cases, like here, polarization of light is measured, which has passed through an optical fiber.

Figure 11:
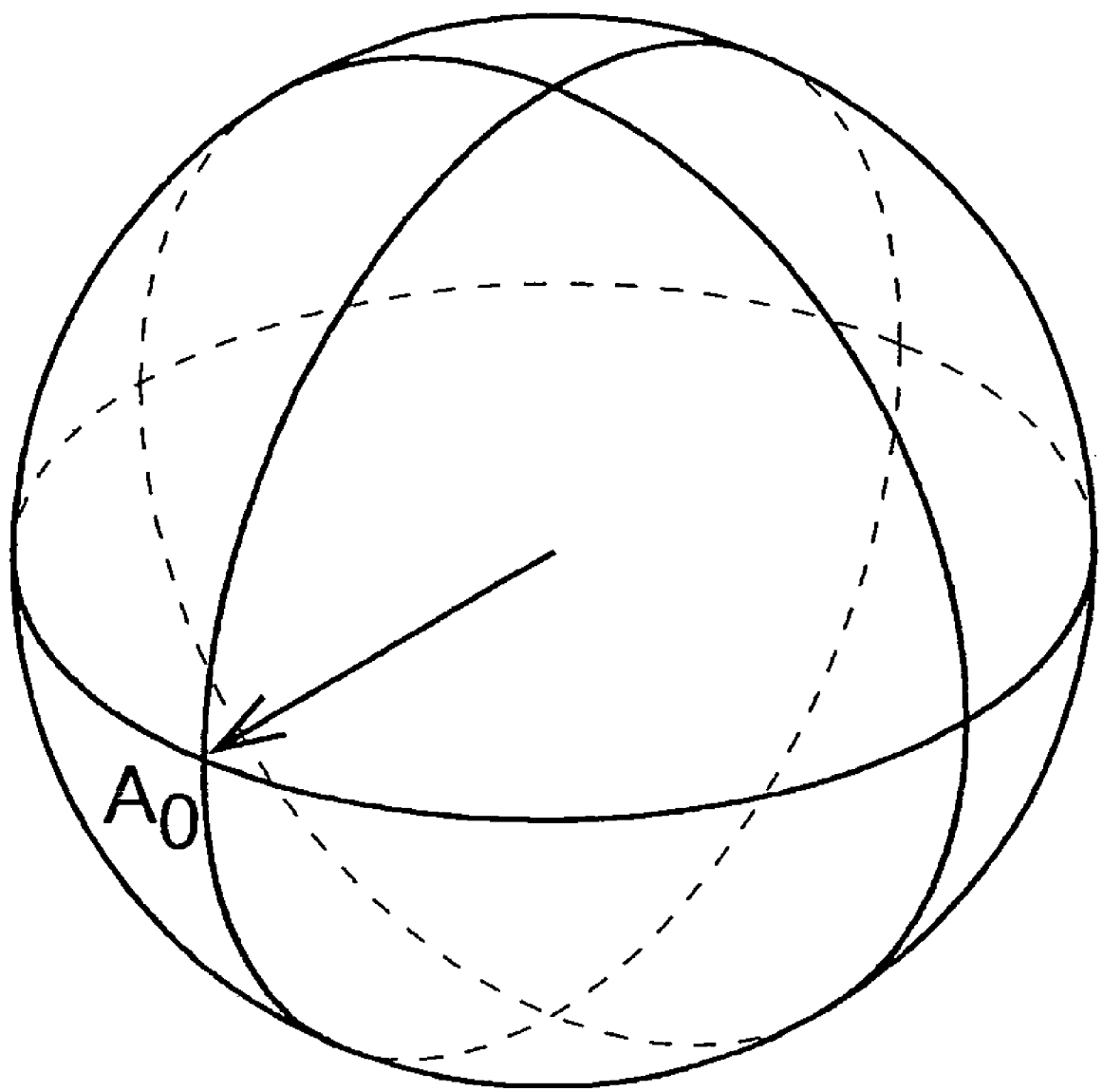
FIG. 11 shows a location of the first equivalent analyzer polarization on a Poincaré sphere.

The first equivalent analyzer polarization A0 can therefore be located at an arbitrary position on the Poincaré sphere as depicted in FIG. 11. It is fixed here to (azimut, ellipticity) =(0, 0).

Figure 12:
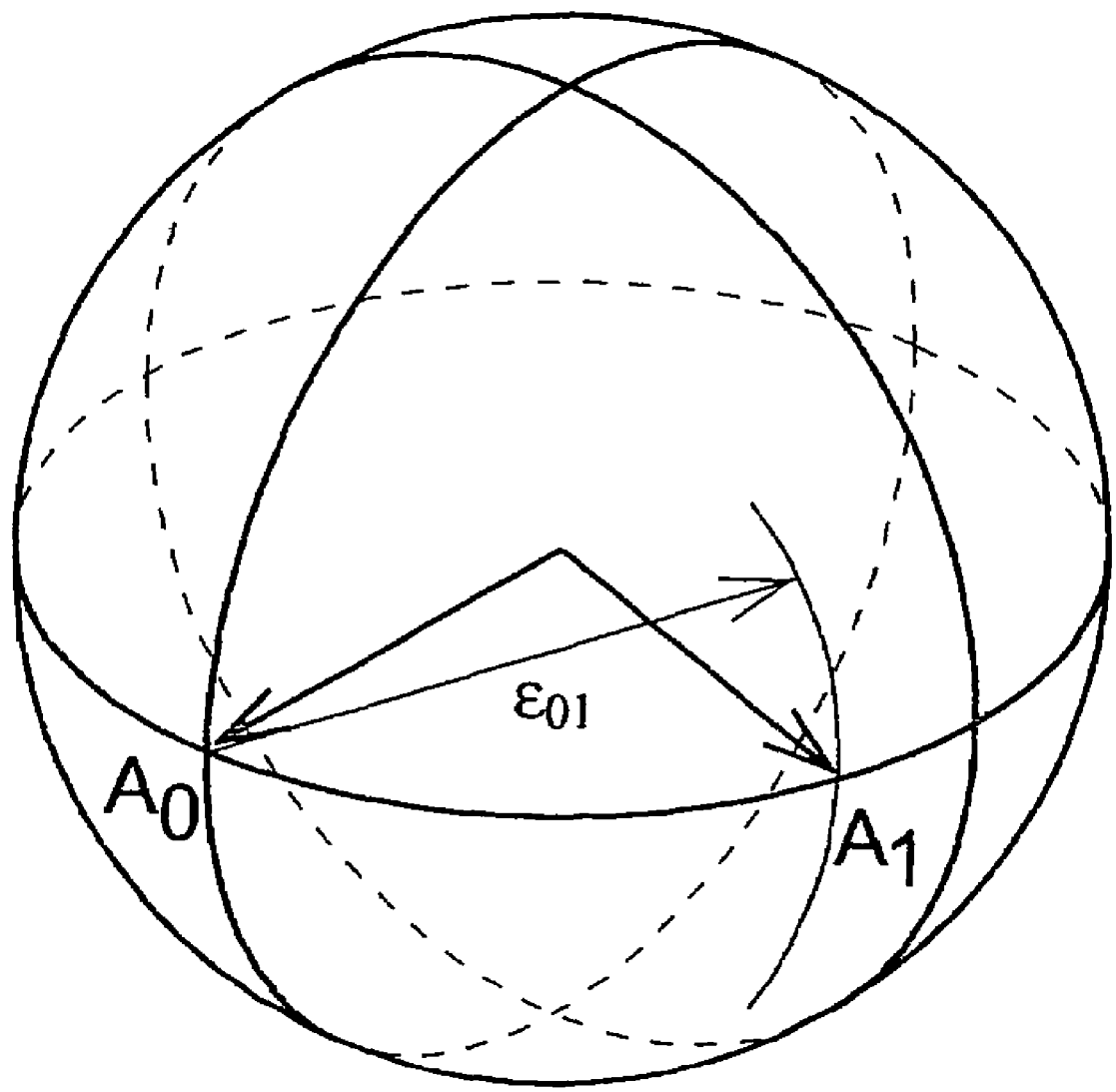
FIG. 12 shows a circle indicating possible locations of the second equivalent analyzer polarization on a Poincaré sphere.

The second equivalent analyzer polarization A1 is located with an angular distance $\epsilon_{01}$ from the first equivalent analyzer polarization A0 on the Poincaré sphere. Possible locations describe therefore a circle around the first equivalent analyzer polarization A0. Due to the previously described rotational invariance, the cross point of the circle of possible locations and the equator of the Poincaré sphere is selected as depicted in FIG. 12.

Figure 13:
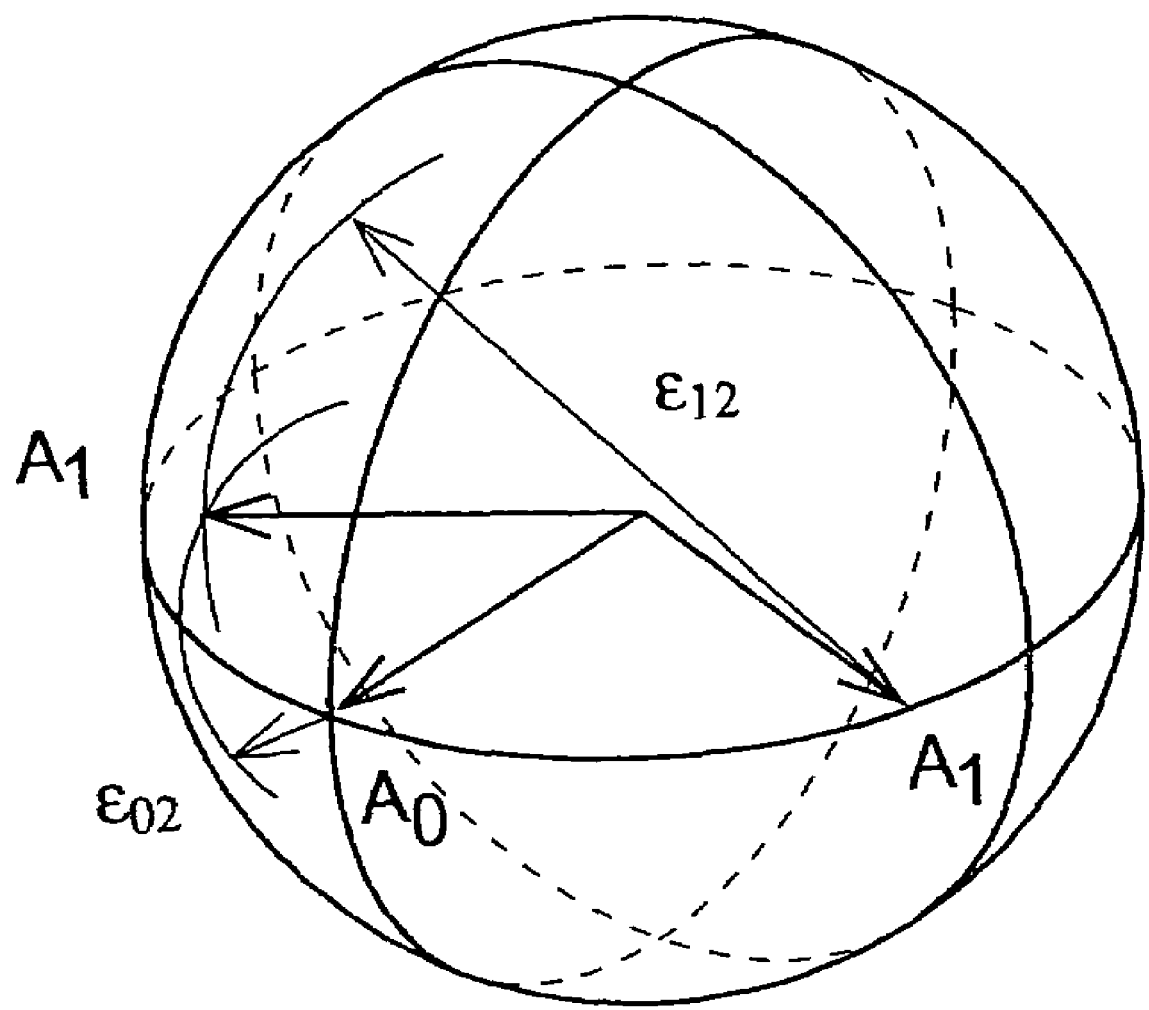
FIG. 13 shows a cross point of circles indicating a possible location of the third equivalent analyzer polarization on a Poincaré sphere.

The third equivalent analyzer polarization A2 is located with an angular distance $\epsilon_{02}$ from the first equivalent analyzer polarization A0, and with an angular distance $\epsilon_{12}$ from the second equivalent analyzer polarization A1, on the Poincaré sphere. Possible locations are therefore the two cross points of the circles around the first and second equivalent analyzer polarizations A0 and A1. From those two possible locations of the third equivalent analyzer polarization A2 one can be selected as depicted in FIG. 13.

The fourth equivalent analyzer polarization A3 is located with an angular distance $\epsilon_{03}$ from the first equivalent analyzer polarization A0, with an angular distance $\epsilon_{13}$ from the second equivalent analyzer polarization A1, and with an angular distance $\epsilon_{23}$ from the third equivalent analyzer polarization A2 on the Poincaré sphere. Possible locations are therefore the two cross points of the circles around the first, second and third equivalent analyzer polarizations A0, A1 and A2. From those possible locations of the fourth equivalent analyzer polarization A3 one can be selected.

In the following, the mathematics used to derive the calibration procedure is shown. Each analyzer of a division of amplitude type polarimeter can be described with respect to a common, arbitrary reference plane by an elliptical polarizer. The intensity $I_n$ (n=0, 1, 2, 3) which can be detected by the n-th analyzer is:

$$I_n = \tau_{an} + \tau_{dn}(\cos 2\theta_n \cos 2\epsilon_n S_1 + \sin 2\theta_n \cos 2\epsilon_n S_2 + \sin 2\epsilon_n S_3). \tag{5}$$

The polarization in the reference plane is described by the Stokes parameters S0, S1, S2 and S3. The equivalent analyzer polarization of the n-th analyzer is characterized by an azimut $\theta_n$ and an ellipticity $\epsilon_n$. The factors $\tau_{an}$ and $\tau_{dn}$ can be calculated from the transmission coefficients $\tau_{maxn} = I_{maxn}$ and $\tau minn = I_{minn}$:

$$\tau_{an} = (\tau_{maxn} + \tau_{minn})/2, \tag{6}$$

$$\tau_{dn} = (\tau_{maxn} - \tau_{minn})/2. \tag{7}$$

Looking at three analyzers which detect the intensities $I_0$, $I_1$ and $I_2$, leads to the following equation:

$$\vec{I}' = Z' \cdot \vec{S}', \tag{8}$$

$$\vec{I}' = \begin{pmatrix} I_0 - \tau_{a0} \\ I_1 - \tau_{a1} \\ I_2 - \tau_{a2} \end{pmatrix}, \vec{S}' = \begin{pmatrix} S_1 \\ S_2 \\ S_3 \end{pmatrix},$$

$$Z' = \begin{pmatrix} \tau_{d0}\cos 2\theta_0 \cos 2\varepsilon_0 & \tau_{d0}\sin 2\theta_0 \cos 2\varepsilon_0 & \tau_{d0}\sin 2\varepsilon_0 \\ \tau_{d1}\cos 2\theta_1 \cos 2\varepsilon_1 & \tau_{d1}\sin 2\theta_1 \cos 2\varepsilon_1 & \tau_{d1}\sin 2\varepsilon_1 \\ \tau_{d2}\cos 2\theta_2 \cos 2\varepsilon_2 & \tau_{d2}\sin 2\theta_2 \cos 2\varepsilon_2 & \tau_{d2}\sin 2\varepsilon_2 \end{pmatrix}.$$

Assuming a constant degree of polarization $p = (S_1^2 + S_2^2 + S_3^2)^{1/2}$, each state of polarization described by the vector $\vec{S}' = (S_1, S_2, S_3)^T$ satisfies:

$$\vec{S}'^T \cdot E \cdot \vec{S}' = p^2, \tag{9}$$

E: unit matrix.

This equation describes a sphere in the variables of the vector components of $\vec{S}'$ with a radius p. Combining equations (8) and (9) leads to:

$$p^2 = \vec{S}'^T \cdot E \cdot \vec{S}' \tag{10}$$

$$= (Z'^{-1} \cdot \vec{I}')^T \cdot E \cdot Z'^{-1} \cdot \vec{I}' \tag{11}$$

$$= \frac{1}{\det(Z')}(Z'^T \cdot \vec{I}')^T \cdot E \cdot \frac{1}{\det(Z')} Z'^T \cdot \vec{I}' \tag{12}$$

$$\Rightarrow \vec{I}'^T \cdot Z' \cdot E \cdot Z'^T \cdot \vec{I}' = p^2 (\det(Z'))^2. \tag{13}$$

The resultant equation describes a second order plane in the variables of the components of the vector in three dimensions. A further classification is possible. All eigenvalues of the symmetric matrix $Z' \cdot E \cdot Z'^T$ are real and positive. The term $p^2 (\det(Z'))^2$ is also always positive. The equation (13) describes therefore an ellipsoid, under the assumption of regularity of the matrix Z' and all its column vectors are linear independent. The physical meaning is, that all analyzers are polarizer ($\tau_{dn}>0$) and the equivalent analyzer polarization are not pairwise identical.

Normalizing the components of the intensity vector $\vec{I}'$, the vectors $$\vec{I}'' = \begin{pmatrix} 1/(\tau_{max\,0} - \tau_{min\,0}) & 0 & 0 \\ 0 & 1/(\tau_{max\,1} - \tau_{min\,1}) & 0 \\ 0 & 0 & 1/(\tau_{max\,2} - \tau_{min\,2}) \end{pmatrix} \cdot \vec{I}' \quad (14)$$

describe an ellipsoid, which is inscribed into a cube with the length of all sides equal to one. The possible values for each component of the intensity vector $\vec{I}''$ is now limited to $-0.5 < I_n'' < 0.5$. The first analyzer detects a maximum intensity $I_0'' = 0.5$ if the polarization in the reference plane equals the equivalent analyzer polarization. For the first analyzer, the detected intensity $I_0''$:

$$I_0'' = 0.5 \text{ therefore maximum for} \begin{cases} S_1 = \cos 2\theta_1 \cos 2\varepsilon_1 \\ S_2 = \cos 2\theta_1 \cos 2\varepsilon_1 \\ S_3 = \sin 2\varepsilon_1 \end{cases} \quad (15)$$

The second analyzer detects at the same polarization at which the first analyzer detect the maximum intensity, an intensity $I_1''$ with:

$$2I_1''(I_0'' = 0.5) = \cos 2\theta_0 \cos 2\varepsilon_0 \cos 2\theta_1 \cos 2\varepsilon_1 + \quad (16)$$
$$\sin 2\theta_0 \cos 2\varepsilon_0 \sin 2\theta_1 \cos 2\varepsilon_1 +$$
$$\sin 2\varepsilon_0 \sin 2\varepsilon_1.$$

The right side of equation (16) is equal to the cosine of the angle $\angle \vec{P}_{Ana0} \vec{P}_{Ana1}$ between the equivalent analyzer polarizations of the first $\vec{P}_{Ana0}$ and second $\vec{P}_{Ana1}$ analyzer, because $$\cos(\angle \vec{P}_{Ana0}\vec{P}_{Ana1}) = \frac{\vec{P}_{Ana0}\vec{P}_{Ana1}}{|\vec{P}_{Ana0}| \cdot |\vec{P}_{Ana1}|}. \quad (17)$$

The orthogonal projection of the ellipsoid composed of the vectors $\vec{I}''$ on the coordinate plane $I_0''$, $I_1''$ leads to a plane with an elliptical shape. For the length of the main axis $a$ and $b$ and the ellipticity $\varepsilon$ of the elliptically shaped plane and for the value $I_1''(I_0''_{max})$, the following relations apply:

$$\tan\varepsilon = \frac{b}{a}, \quad (18)$$

$$\cos\delta = 2I_1''(I_0''_{max}), \quad (19)$$

$$\left.\begin{array}{l} a^2 + b^2 = \dfrac{1}{2} \\ \pm ab = \dfrac{1}{4}\sin\delta \end{array}\right\} \text{Lemma of Apollonius} \quad (20)$$

From this, the relation of the angle between the equivalent analyzer polarizations $\vec{P}_{Ana0}$, $\vec{P}_{Ana1}$ and the ellipticity $\varepsilon$ can be derived. From equations (18)–(20):

$$\frac{2ab}{a^2 + b^2} = \pm\sin\delta \quad (21)$$
$$= \frac{2\tan\varepsilon}{1 + \tan^2\varepsilon}$$
$$= \sin 2\varepsilon$$
$$\Rightarrow \delta = \pm 2\varepsilon.$$

With equations (16), (17) and (19) the relation of the angle $\angle \vec{P}_{Anan} \vec{P}_{Anam}$ between two equivalent analyzer polarizations $\vec{P}_{Anan}$, $\vec{P}_{Anam}$ and the ellipticity $\varepsilon_{nm}$ calculates to:

$$\cos(\angle\vec{P}_{Anan}\vec{P}_{Anam}) = 2I_m''(I_n''_{max}) = \cos\delta_{nm} = \cos 2\varepsilon_{nm} \quad (22)$$

$$\Rightarrow \angle\vec{P}_{Anan}\vec{P}_{Anam} = 2\varepsilon_{nm}. \quad (23)$$

This applies to each possible pair of analyzers.

Next, with respect to the principle measurement accuracy of the degree of polarization, three configurations and possible variations of a division of amplitude type polarimeter are discussed. Those configurations are named "Orthogonal", "Tetragonal" and "Diamond". They differ in the number and arrangement of utilized optical components. The "Orthogonal" scheme is used in the following reference.

"A study for wavelength dependency of Polarization Analysis Module", T. Miyakoshi, S. Shikii, Y. Hotta, S. Boku, Institute of Electronics, Information and Communication Engineers, sougou taikai B-10-95, p. 528, 2001

In this reference, a division of amplitude type polarimeter, composed of three beam-splitters, four polarizers, one quarter-wave retarder, four photodiodes and data acquisition electronics are described.

"Tetragonal" is a compromise between complexity and realizable accuracy. "Diamond" is with respect to DOP accuracy and sensitivity to noise an ideal configuration but requires the most complex arrangement.

To compare the principal performance of a specific arrangement, the condition number of the 4×4 instrument matrix, describing the relation between measured optical intensities and the Stokes vector, can be used. The condition numbers (calculated according to Hadamard) of the schemes "Orthogonal", "Tetragonal" and "Diamond" are 2.0, 1.5 and 1.3, respectively.

In order to numerically investigate the dependence of the principal DOP accuracy on angular misalignment of optical components, the difference between real and supposed polarizer angles has been varied through the values 0°, 0.1°, 0.5°, 1° up to 2°. Those values where alternatively added to and subtracted from the four polarizer angles, which can be supposed to be approximately the worst case.

To take further into account noise, the quantification noise due to A/D conversion of the photodiode currents is supposed to be the main source. The resolution of A/D conversion has been varied through the values 8, 10, 12, 14 up to 16 bit.

The offsets due to photodiode dark currents and amplifiers are supposed to be zero. Signals are supposed to fully cover the dynamic range of the A/D conversion. Extinction ratios of the polarizers are supposed to be arbitrary high. Incorporated retardations are supposed to be fixed.

Figure 14:
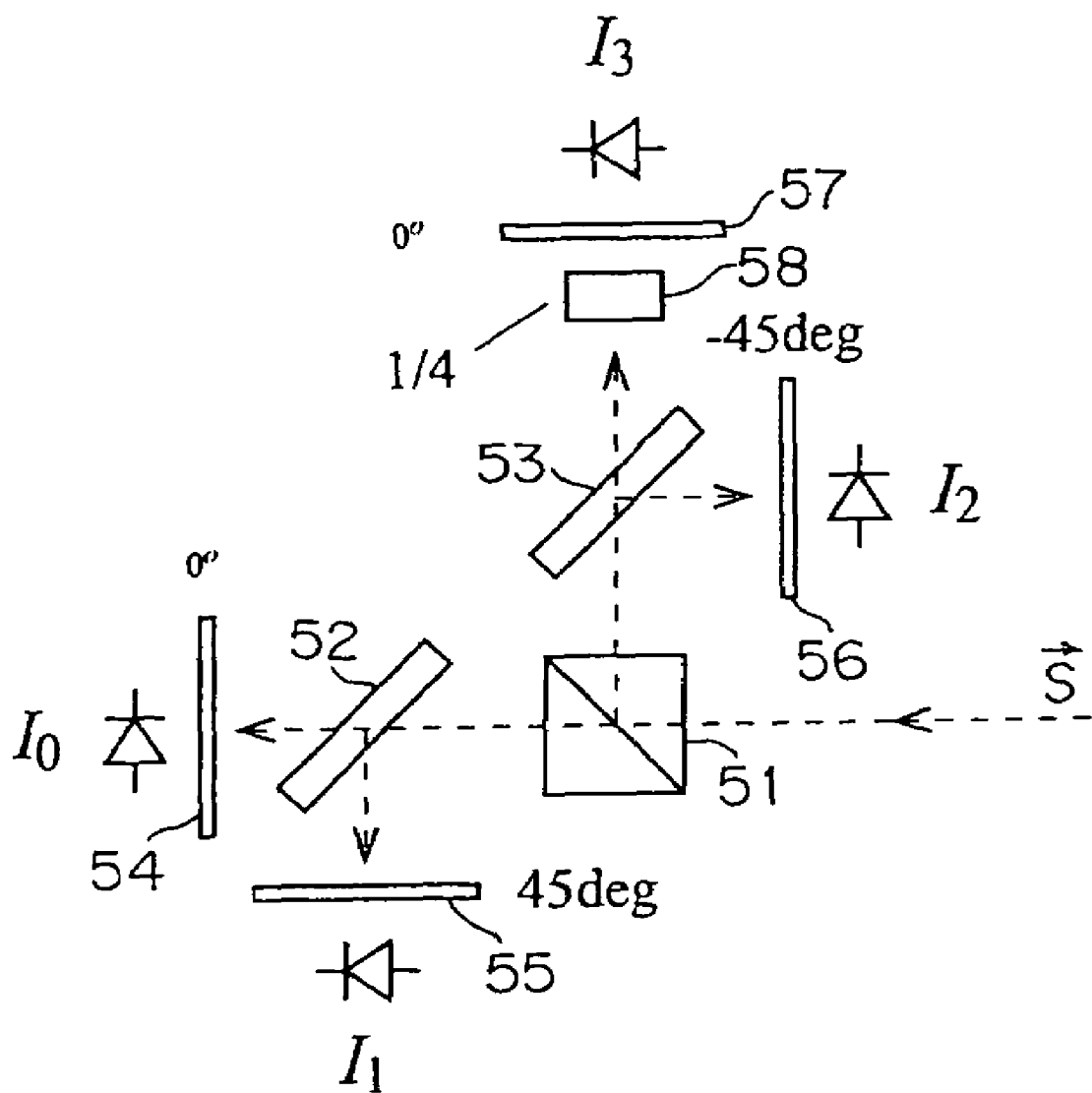
FIG. 14 shows an orthogonal type configuration of a division of amplitude type polarimeter.
Figure 15:
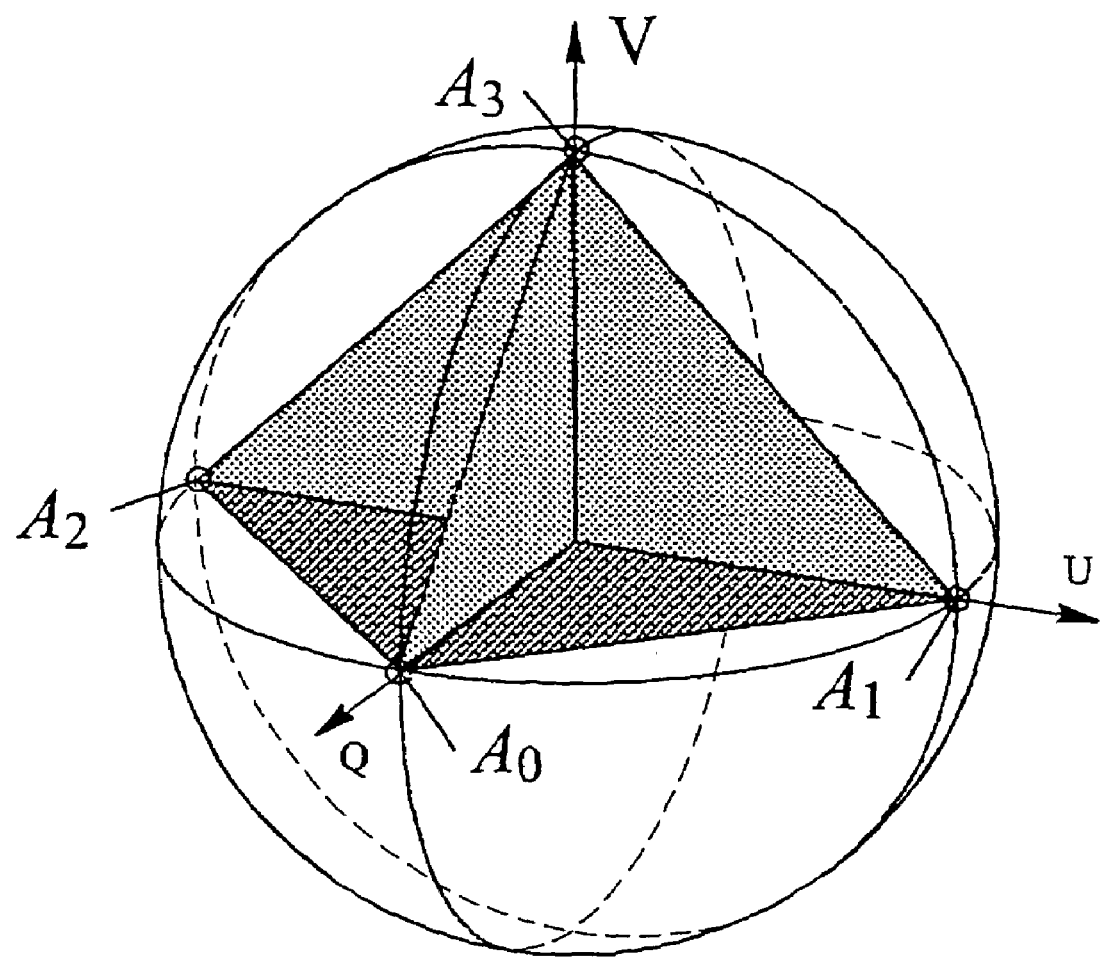
FIG. 15 shows equivalent analyzer polarizations of an orthogonal type configuration on a Poincaré sphere.

An "Orthogonal" type configuration of a division of amplitude type polarimeter is depicted in FIG. 14. A basic configuration of this polarimeter includes three beam splitters 51, 52 and 53, four polarizers 54, 55, 56 and 57, and one retarder 58 with retardation of a quarter of a wavelength. Angles of the polarizers 54 and 57 are 0° and angles of the polarizers 55 and 56 are 45° and −45°, respectively. As shown in FIG. 15, the components are arranged such that the equivalent analyzer polarizations (A0, A1, A2, A3) are mutually orthogonal on a Poincaré sphere. The dependence of the principal DOP accuracy [%] on noise (A/D resolution [bit]) and angular uncertainty [°] is shown for exemplified values in FIG. 16.

Figure 17:
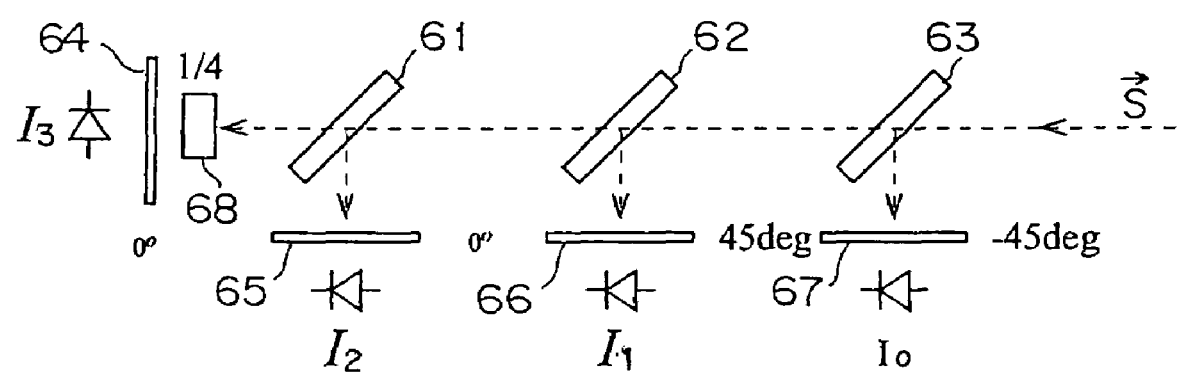
FIG. 17 shows a variant configuration of an orthogonal type polarimeter.

A variant configuration of the "Orthogonal" type polarimeter is depicted in FIG. 17. This polarimeter includes three beam splitters 61, 62 and 63, four polarizers 64, 65, 66 and 67, and one retarder 68 with retardation of a quarter of a wavelength. Angles of the polarizers 64 and 65 are 0° and angles of the polarizers 66 and 67 are 45° and −45°, respectively.

Figure 18:
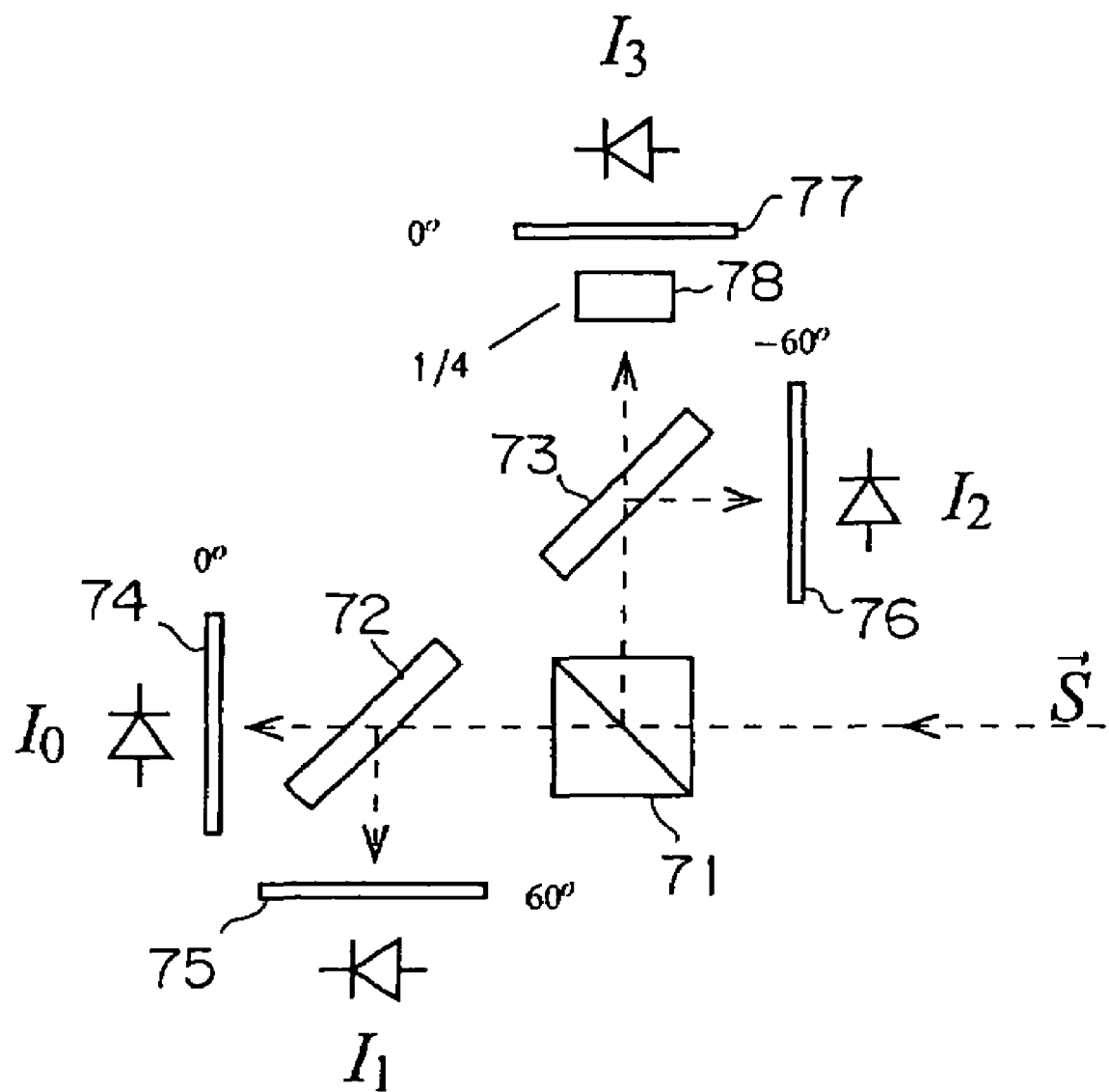
FIG. 18 shows a tetragonal type configuration of a division of amplitude type polarimeter.
Figure 19:
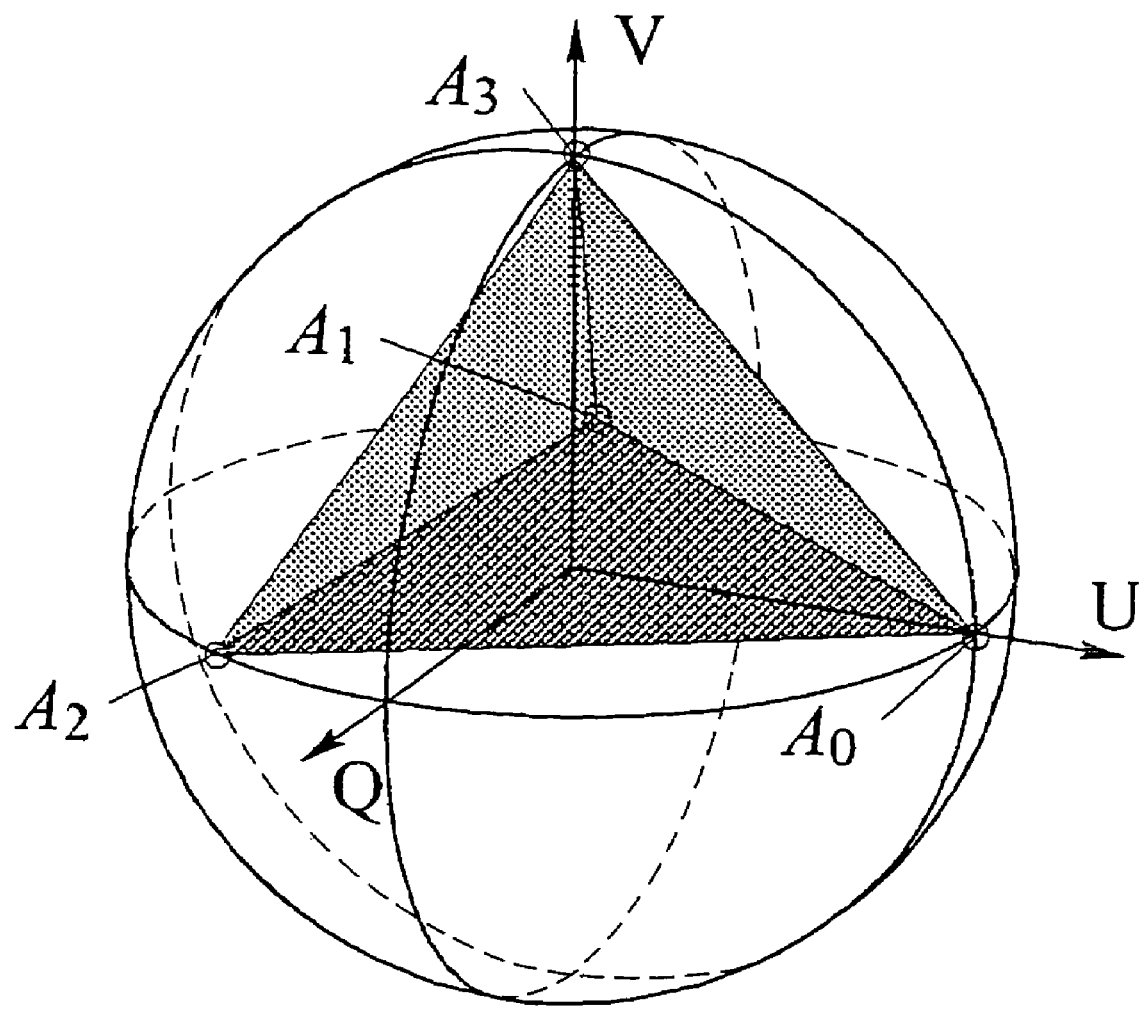
FIG. 19 shows equivalent analyzer polarizations of a tetragonal type configuration on a Poincaré sphere.

A "Tetragonal" type configuration of a division of amplitude type polarimeter is depicted in FIG. 18. A basic configuration of this polarimeter includes three beam splitters 71, 72 and 73, four polarizers 74, 75, 76 and 77, and one retarder 78 with retardation of a quarter of a wavelength. Angles of the polarizers 74 and 77 are 0° and angles of the polarizers 75 and 76 are 60° and −60°, respectively. As shown in FIG. 19, the components are arranged such that the equivalent analyzer polarizations (A0, A1, A2, A3) are angular spaced by 120° on a Poincaré sphere. A3 is orthogonal to all other equivalent analyzer polarizations. The dependence of the principal DOP accuracy on noise and angular uncertainty is shown for exemplified values in FIG. 20.

Figure 21:
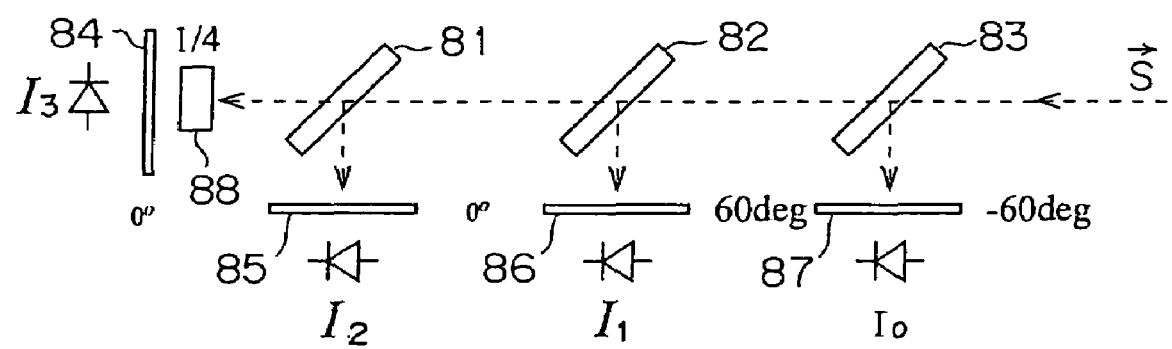
FIG. 21 shows a variant configuration of a tetragonal type polarimeter.

A variant configuration of the "Tetragonal" type polarimeter is depicted in FIG. 21. This polarimeter includes three beam splitters 81, 82 and 83, four polarizers 84, 85, 86 and 87, and one retarder 88 with retardation of a quarter of a wavelength. Angles of the polarizers 84 and 85 are 0° and angles of the polarizers 86 and 87 are 60° and −60°, respectively.

Figure 22:
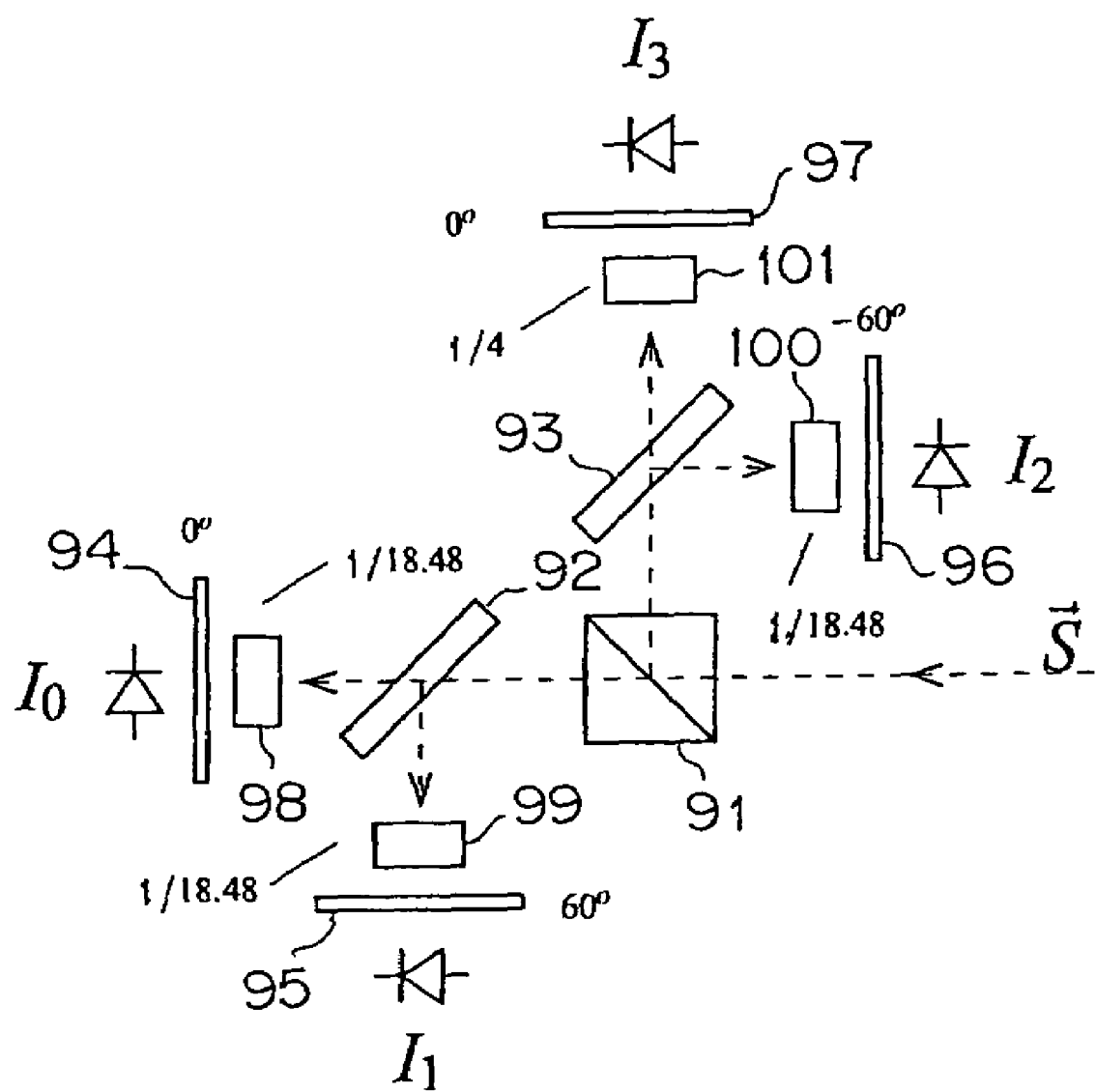
FIG. 22 shows a diamond type configuration of a division of amplitude type polarimeter.
Figure 23:
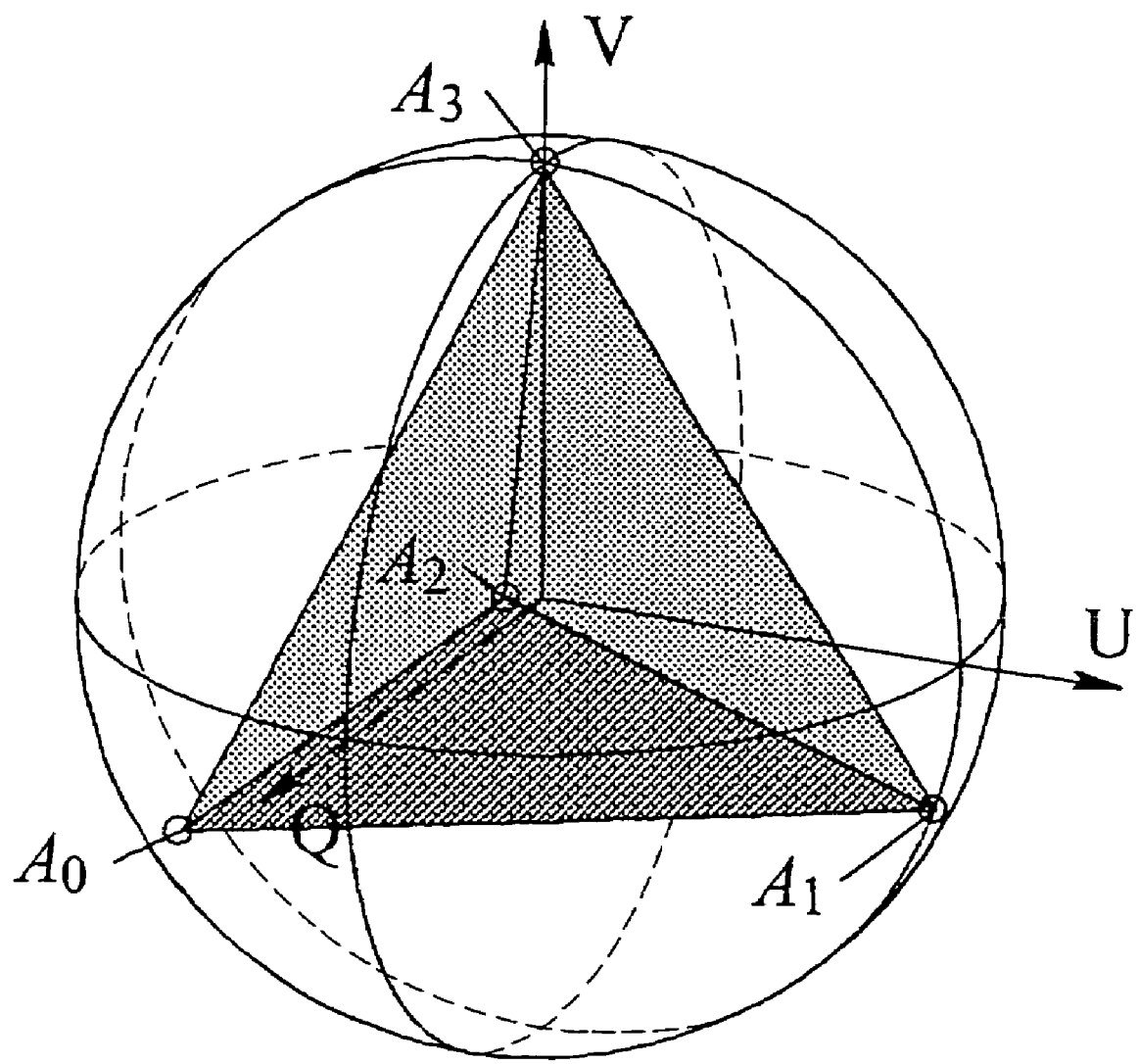
FIG. 23 shows equivalent analyzer polarizations of a diamond type configuration on a Poincaré sphere.

A "Diamond" type configuration of a division of amplitude type polarimeter is depicted in FIG. 22. A basic configuration of this polarimeter includes three beam splitters 91, 92 and 93, four polarizers 94, 95, 96 and 97, and four retarders 98, 99, 100 and 101. Angles of the polarizers 94 and 97 are 0° and angles of the polarizers 95 and 96 are 60° and −60°, respectively. Retardation of the retarders 98, 99 and 100 is $1/18.48$ of a wavelength and that of the retarder 101 is a quarter of a wavelength. As shown in FIG. 23, the components are arranged such that the equivalent analyzer polarizations (A0, A1, A2, A3) form a structure like atoms in a diamond on a Poincaré sphere. The dependence of the principal DOP accuracy on noise and angular uncertainty is shown for exemplified values in FIG. 24.

Figure 25:
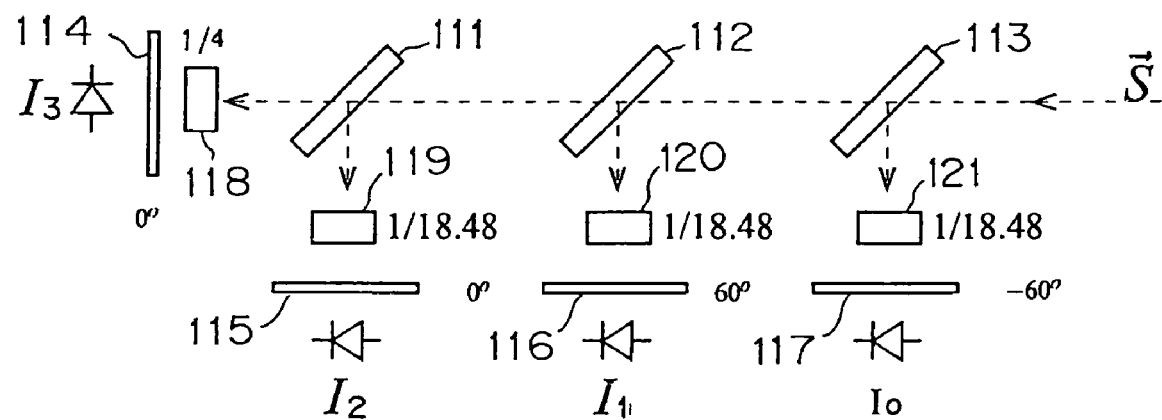
FIG. 25 shows a variant configuration of a diamond type polarimeter.

A variant configuration of the "Diamond" type polarimeter is depicted in FIG. 25. This polarimeter includes three beam splitters 111, 112 and 113, four polarizers 114, 115, 116 and 117, and four retarders 118, 119, 120 and 121. Angles of the polarizers 114 and 115 are 0° and angles of the polarizers 116 and 117 are 60° and −60°, respectively. Retardation of the retarder 118 is a quarter of a wavelength and that of the retarders 119, 120 and 121 is $1/18.48$ of a wavelength.

FIG. 26 shows another variant configuration of the "Diamond" type polarimeter. This polarimeter includes three beam splitters 131, 132 and 133, four polarizers 134, 135, 136 and 137, and two retarders 138 and 139. Angles of the polarizers 134 and 135 are 0° and angles of the polarizers 136 and 137 are 60° and −60°, respectively. Retardation of the retarder 138 is $1/18.48$ subtracted from a quarter of a wavelength and that of the retarder 139 is $1/18.48$ of a wavelength.

In the above described configurations, the angles of the polarizers and the retardation of the retarders are not limited to the respective theoretical values themselves but can be within a given tolerance range (±5% for example) of the values.

The autonomous calibration procedure requires besides a constant degree of polarization of the light source, which is easy to realize, a constant input power. This can be realized by either using polarization converters for polarization modulation with low dependence of the insertion loss on polarization like crystal based or fiber based devices. In the case a polarization converter with untolerable high dependence of insertion loss on polarization is used, like multi stages of variable birefringent plates or integrated optical realizations, the power of the light wave must be measured simultaneous with the intensities of the polarimeter to be calibrated.

Simultaneous power measurement can be either realized by a 1×2 coupler, whereas one arm is used for power monitoring and the other for the polarimeter to be calibrated.

Figure 27:
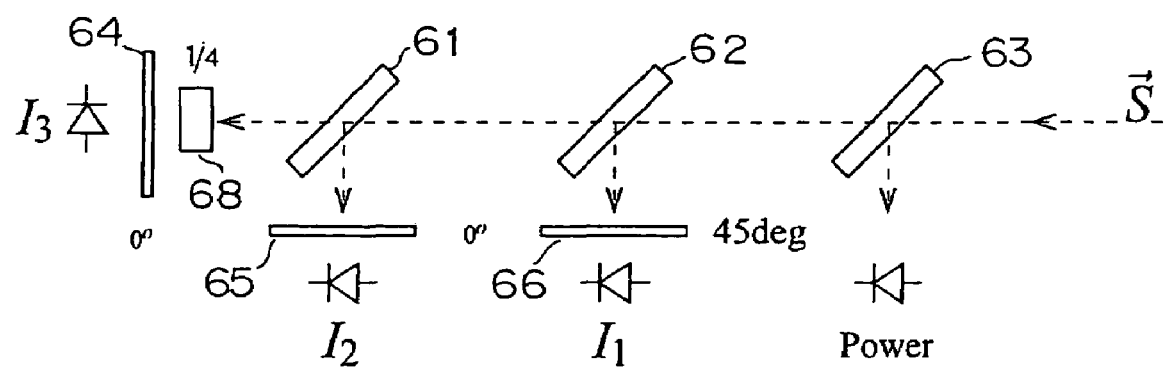
FIG. 27 shows a variant configuration of a division of amplitude type polarimeter for autonomous calibration.

An alternative is to realize a division of amplitude type polarimeter where only three polarizers are used and one of the four light beams is used for the power monitoring as depicted in FIG. 27. The configuration shown in FIG. 27 is obtained by removing the polarizer 67 from the configuration shown in FIG. 17.

Figure 28:
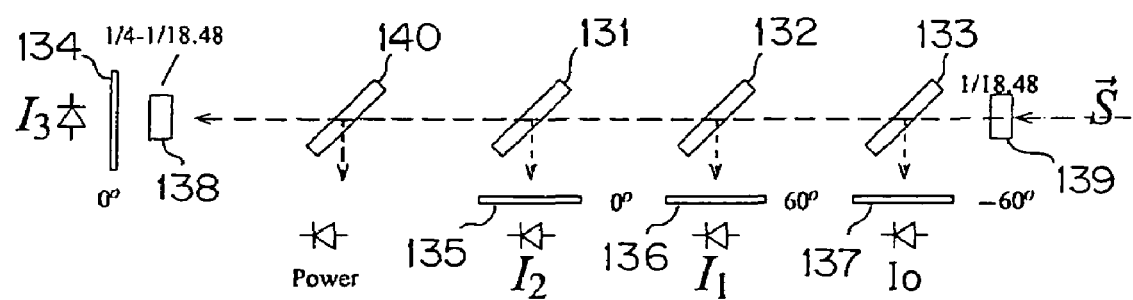
FIG. 28 shows another variant configuration of a division of amplitude type polarimeter for autonomous calibration.

Another realization possibility is depicted in FIG. 28, in which the light beam is split into five beams. The configuration shown in FIG. 28 is obtained by inserting an additional beam splitter 140 into the configuration shown in FIG. 26. While four of the beams are transmitted through optics as described above, the fifth beam from the beam splitter 140 is used for power monitoring.

In the application of a division of amplitude type polarimeter for an adaptive polarization mode dispersion compensator as a distortion monitor, one of the described variants can be used, whereas the required accuracy for the degree of polarization measurement is provided after the described calibration procedure (measurement of the instrument matrix Z) has been applied. The basic algorithm for adjusting the adaptive optics of a polarization mode dispersion compensator, is provided by means of a gradient search algorithm assuring a maximum degree of polarization.

In order to improve the speed with which the adaptive optics of a polarization mode dispersion compensator can be controlled and/or to avoid ambiguities of the correlation between degree of polarization and signal distortion due to polarization mode dispersion, in the following other variants are described.

While it is possible to adaptively control a polarization mode dispersion compensator by tracking the maximum degree of polarization, the principal realizable tracking speed could be improved by including the measured state of polarization. In general, the measured state of polarization is very sensitive to variations of the polarization transfer function of an optical fiber, while the degree of polarization shows only moderate sensitivity which can be covered by the limited measurement accuracy even if it is in the order of 1% or better.

Figure 29:
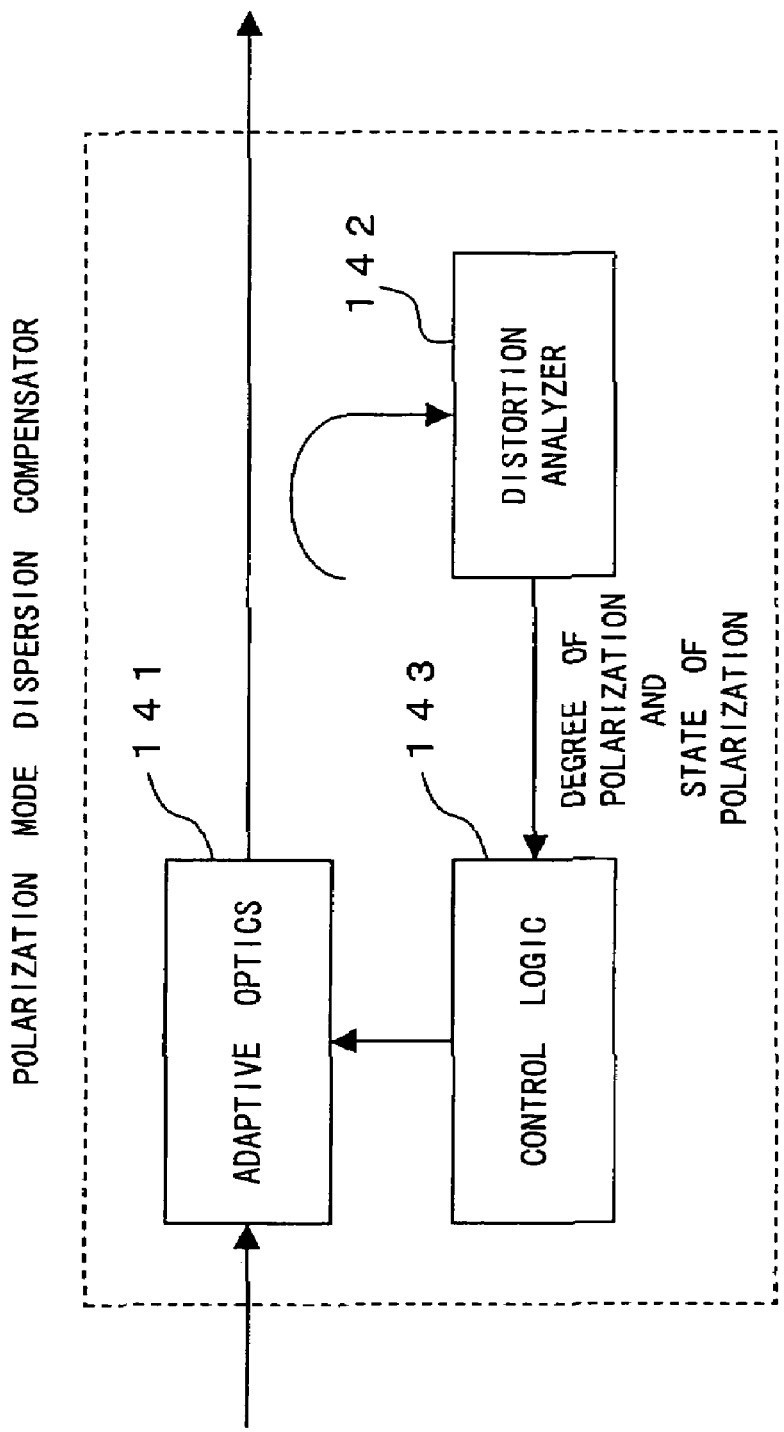
FIG. 29 shows a polarization mode dispersion compensator using degree of polarization and a state of polarization as feedback signals.

Monitoring beside the degree of polarization also the state of polarization as depicted in FIG. 29 leads to the possibility of a more sophisticated algorithm. The polarization mode dispersion compensator shown in FIG. 29 includes adaptive optics 141, distortion analyzer 142 and control logic 143. The distortion analyzer 142 provides beside the degree of polarization as a measure of signal distortion also the state of polarization to the control logic 143 as feedback signals. The control logic 143 receives the feedback signals and produces a control signal for the adaptive optics 141 based on the received signals.

As long as the state of polarization shows only small variations, the polarization mode dispersion properties of the optical transmission system also only vary slightly and readjustment of the adaptive optics 141 is not required during this time. This idle time can be advantageously used to perform other operations like readjusting or rewinding components of a polarization converter to their main operating point.

In the case the state of polarization changes, the polarization mode dispersion properties of the optical transmission system have changed and readjustment of the adaptive optics 141 is necessary. The angular change and speed with which the state of polarization has changed, can be used as a measure of how strong the conditions of the adaptive optics 141 must be readjusted.

Figure 30:
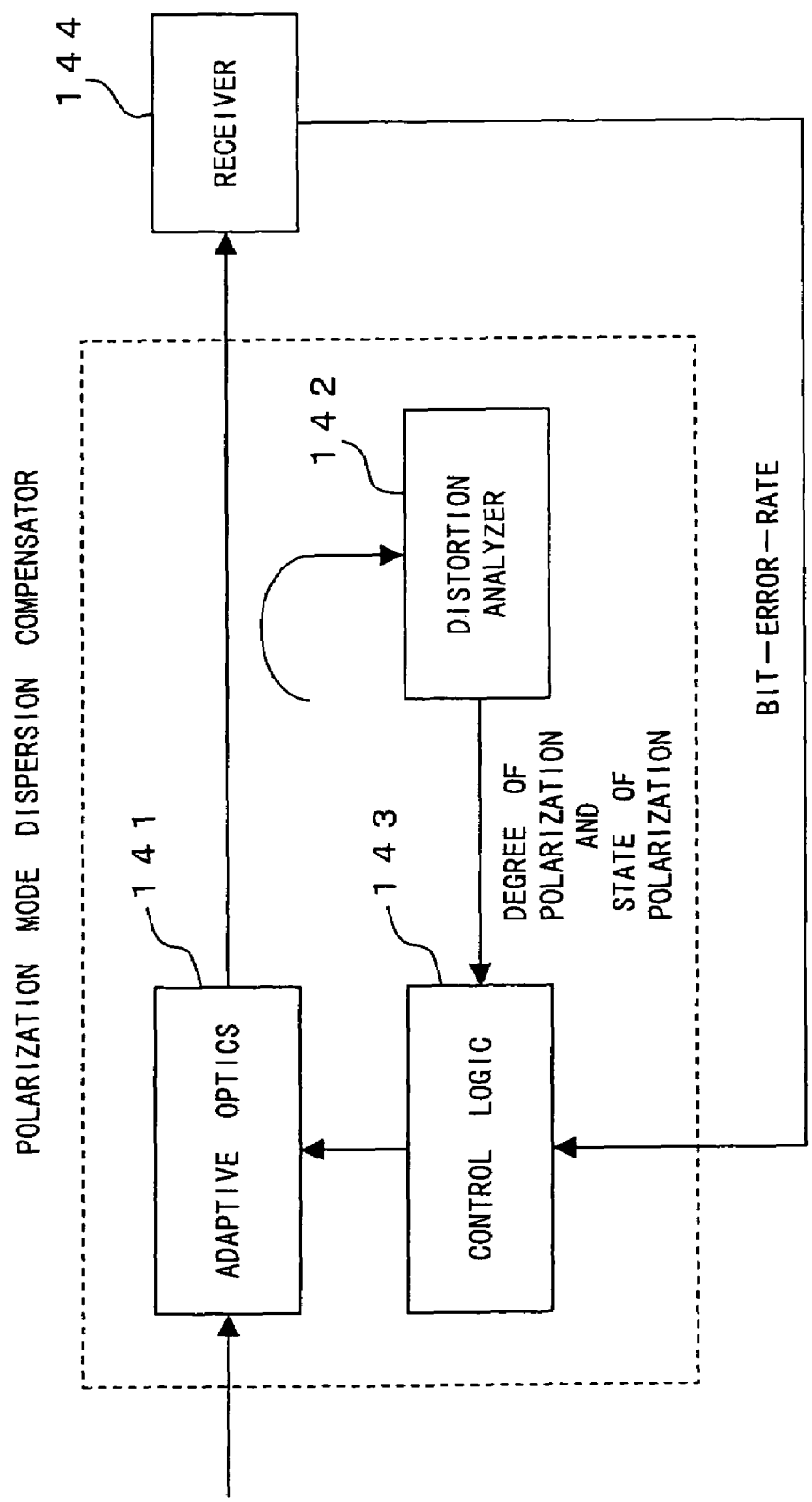
FIG. 30 shows a polarization mode dispersion compensator using degree of polarization and/or a state of polarization and a bit-error rate as feedback signals.

To avoid ambiguities, i.e. cases in which a maximum degree of polarization does not correspond to minimum signal distortion, a combination of degree of polarization as a fast feedback signal, and a bit-error rate as provided by e.g. forward-error-correcting electronics as an ultimate measure of signal distortion can be used as depicted in FIG. 30. The polarization mode dispersion compensator shown in FIG. 30 has a similar configuration to that shown in FIG. 29. The distortion analyzer 142 provides the control logic 143 with only the degree of polarization or the combination of the degree of polarization and the state of polarization. Receiver 144 includes forward-error-correcting electronics and outputs a bit-error rate as a feedback signal. The control logic 143 receives the feedback signals from the distortion analyzer 142 and the receiver 144 and produces a control signal for the adaptive optics 141 based on the received signals.

While fast changes of the polarization mode dispersion properties of an optical transmission system require a fast feedback signal as provided by the measurement of the degree of polarization, for fine tuning purposes the bit-error rate as provided by the forward-error-correcting electronics at the receiver 144 is used.

As described in detail above, according to the present invention, the requirements on mechanical alignment accuracy for a polarimeter are drastically relaxed since the polarization properties are measured after the polarimeter is assembled. Therefore, tedious and cost intensive mechanical alignment is not required.

What is claimed is:

1. A polarization mode dispersion compensator, comprising:
   an optical unit receiving an input optical signal and outputting an output optical signal;
   a distortion analyzer having a polarimeter and producing a feedback signal; and
   a controller producing a control signal to adjust said optical unit, based on the feedback signal; and
   wherein said polarimeter having a plurality of optical components to measure intensity signals, the plurality of optical components are configured in such a way that a Poincaré sphere is fully covered by the intensity signals; and
   said distortion analyzer produces the feedback signal by calculating the intensity signals.

2. A polarization mode dispersion compensator according to claim 1, wherein:
   said distortion analyzer produces the feedback signal by using an instrument matrix of said polarimeter; and
   the instrument matrix is obtained by the configuration of said plurality of optical components.

3. A polarization mode dispersion compensator according to claim 2, wherein
   the instrument matrix is obtained by plotting two of the intensity signals on a plane for the different states of polarization and determining an azimut and an ellipticity of an ellipse which surrounds plotted points.

4. A polarization mode dispersion compensator according to claim 3, wherein
   maximum and minimum intensity of the plotted points are further determined for each of the two of the intensity signals and used, together with the azimut and ellipticity, as the information of the instrument matrix.

5. A polarization mode dispersion compensator according to claim 1, wherein:
   said plurality of optical components are four analyzers to produce four intensity signals; and
   said four analyzers are arranged such that equivalent analyzer polarizations of three analyzers are angularly spaced by 120 degrees on a Poincaré sphere and an equivalent analyzer polarization of another analyzer is orthogonal to the equivalent analyzer polarizations of the three analyzers on the Poincaré sphere.

6. A polarization mode dispersion compensator according to claim 1, wherein:
   said plurality of optical components are four analyzers to produce four intensity signals; and
   said four analyzers are arranged such that equivalent analyzer polarizations of the four analyzers form a structure like atoms in a diamond on a Poincaré sphere.

7. A polarization mode dispersion compensator according to claim 1, wherein
   said controller receives a feedback signal which represents a bit-error rate of the output optical signal and produces the control signal based on both the feedback signal representing the degree of polarization and the feedback signal representing the bit-error rate.

8. A polarization mode dispersion compensator according to claim 1, wherein:
   said distortion analyzer produces a feedback signal which represents a state of polarization of the output optical signal; and
   said controller receives a feedback signal which represents a bit-error rate of the output optical signal and produces the control signal based on the feedback signal representing the degree of polarization, the feedback signal representing the state of polarization and the feedback signal representing the bit-error rate.

9. A distortion analyzers, comprising:
   a polarimeter which includes a plurality of optical components to produce a plurality of intensity signals from an input optical signal; and a processor producing a feedback signal, which represents degree of polarization of the input optical signal, for polarization mode dispersion compensation from the intensity signals; and wherein said polarimeter having a plurality of optical components to measure intensity signals, the plurality of optical components are configured in such a way that a Poincaré sphere is fully covered by the intensity signals; and and said distortion analyzer produces the feedback signal by calculating the intensity signals.

10. A method of polarization mode dispersion compensation, comprising:

determining a polarization property of a polarimeter through calibration using a plurality of intensity signals output from a polarimeter;

producing an output optical signal through an optical unit from an input optical signal; and producing a feedback signal; and adjusting said optical unit according to the feedback signal;

wherein said polarimeter having a plurality of optical components to measure intensity signals, the plurality of optical components are configured in such a way that a Poincaré sphere is fully covered by the intensity signals; and and said distortion analyzer produces the feedback signal by calculating the intensity signals.

11. A polarization mode dispersion compensator, comprising:

optical means for receiving an input optical signal and outputting an output optical signal;

distortion analyzer having a polarimeter; and a controller for producing a control signal to adjust said optical unit, based on the feedback signal;

wherein said polarimeter having a plurality of optical components to measure intensity signals, the plurality of optical components are configured in such a way that a Poincaré sphere is fully covered by the intensity signals; and and said distortion analyzer produces the feedback signal by calculating the intensity signals.

12. A distortion analyzer, comprising:

polarimeter means which includes a plurality of optical means to produce a plurality of intensity signals from an input optical signal; and processor means for producing a feedback signal, which represents degree of polarization of the input optical signal, for polarization mode dispersion compensation from the intensity signals;

wherein said polarimeter having a plurality of optical components to measure intensity signals, the plurality of optical components are configured in such a way that a Poincaré sphere is fully covered by the intensity signals; and and said distortion analyzer produces the feedback signal by calculating the intensity signals.

13. A polarization mode dispersion compensator, comprising:

an optical unit receiving an input optical signal and outputting an output optical signal;

a distortion analyzer which includes a polarimeter, analyzing the output optical signal and producing a feedback signal, which represents degree of polarization of the output optical signal, by using a polarization property of the polarimeter, the polarization property determined through calibration using a plurality of intensity signals output from the polarimeter; and a controller producing a control signal to adjust said optical unit, based on the feedback signal, and wherein said polarimeter includes a plurality of optical components forming four analyzers to produce four intensity signals; and the optical components are arranged such that equivalent analyzer polarizations of the four analyzers form a structure like atoms in a diamond on a Poincaré sphere.

* * * * *

UNITED STATES PATENT AND TRADEMARK OFFICE
CERTIFICATE OF CORRECTION

PATENT NO. : 7,030,973 B2 Page 1 of 1
APPLICATION NO. : 10/736514
DATED : April 18, 2006
INVENTOR(S) : Jens C. Rasmussen et al.

It is certified that error appears in the above-identified patent and that said Letters Patent is hereby corrected as shown below:

Column 14, Line 61, change "analyzers," to --analyzer,--.

Column 15, Line 10, delete "and" before "said".

Column 15, Line 27, delete "and" before "said".

Column 16, Line 1, delete "and" before "said".

Column 16, Line 16, delete "and" before "said".

Signed and Sealed this

Fourteenth Day of November, 2006

JON W. DUDAS
*Director of the United States Patent and Trademark Office*